United States Patent
Son et al.

(10) Patent No.: US 10,305,101 B2
(45) Date of Patent: May 28, 2019

(54) CATHODE ACTIVE MATERIAL, CATHODE AND LITHIUM SECONDARY BATTERY INCLUDING THE SAME, AND METHOD OF PREPARING CATHODE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Youhwan Son, Seongnam-si (KR); Dongwook Han, Suwon-si (KR); Jaegu Yoon, Suwon-si (KR); Dongwook Shin, Suwon-si (KR); Yongnam Ham, Osan-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 124 days.

(21) Appl. No.: 15/200,052

(22) Filed: Jul. 1, 2016

(65) Prior Publication Data

US 2017/0062816 A1     Mar. 2, 2017

(30) Foreign Application Priority Data

Aug. 24, 2015 (KR) .................... 10-2015-0118875

(51) Int. Cl.
*H01M 4/485* (2010.01)
*C01G 45/00* (2006.01)
(Continued)

(52) U.S. Cl.
CPC ............ *H01M 4/485* (2013.01); *C01G 45/00* (2013.01); *C01G 45/1228* (2013.01); *C01G 51/00* (2013.01); *C01G 51/42* (2013.01); *C01G 53/00* (2013.01); *C01G 53/006* (2013.01); *C01G 53/42* (2013.01); *C01G 53/50* (2013.01); *H01M 4/505* (2013.01); *C01P 2002/72* (2013.01);
(Continued)

(58) Field of Classification Search
CPC ...... H01M 4/485; H01M 4/505; C01G 45/00; C01G 45/1228; C01G 51/00; C01G 51/42; C01G 53/00; C01G 53/006; C01G 53/42; C01G 53/50
See application file for complete search history.

(56) References Cited

U.S. PATENT DOCUMENTS 5,153,081 A * 10/1992 Thackeray ............. C01G 45/02
423/599
5,783,333 A * 7/1998 Mayer ................... H01M 4/131
423/332
(Continued)

FOREIGN PATENT DOCUMENTS

JP          2004253169 A    9/2004
KR       1020130053171 A    5/2013
(Continued)

*Primary Examiner* — Helen Oi K Conley
(74) *Attorney, Agent, or Firm* — Cantor Colburn LLP

(57) ABSTRACT

A cathode active material including a layered lithium transition metal oxide, wherein the layered lithium transition metal oxide includes a metal cation having an oxidation number of +4, and wherein the metal cation is disposed in an octahedral site of a lattice of the layered lithium transition metal oxide.

19 Claims, 19 Drawing Sheets

(51) Int. Cl.
   *C01G 45/12* (2006.01)
   *C01G 51/00* (2006.01)
   *C01G 53/00* (2006.01)
   *H01M 4/505* (2010.01)
   *H01M 10/052* (2010.01)

(52) U.S. Cl.
   CPC ...... *C01P 2002/77* (2013.01); *C01P 2004/03* (2013.01); *C01P 2006/40* (2013.01); *H01M 10/052* (2013.01)

(56) References Cited

U.S. PATENT DOCUMENTS

| | | | |
|---|---|---|---|
| 2005/0079417 A1* | 4/2005 | Kim | H01M 4/485 429/231.2 |
| 2006/0127295 A1* | 6/2006 | Franger | C01B 25/26 423/277 |
| 2011/0052991 A1* | 3/2011 | Kim | H01M 4/364 429/231 |
| 2011/0226985 A1* | 9/2011 | Park | C01G 45/1228 252/182.1 |
| 2015/0010823 A1 | 1/2015 | Yu et al. | |
| 2015/0044563 A1 | 2/2015 | Kwon et al. | |
| 2016/0336594 A1 | 11/2016 | Ahn et al. | |

FOREIGN PATENT DOCUMENTS

| | | |
|---|---|---|
| KR | 1020130077907 A | 7/2013 |
| KR | 1020130095572 A | 8/2013 |
| KR | 1020150004645 A | 1/2015 |
| KR | 1020150017985 A | 2/2015 |
| KR | 1020160134317 A | 11/2016 |

* cited by examiner

CATHODE ACTIVE MATERIAL, CATHODE AND LITHIUM SECONDARY BATTERY INCLUDING THE SAME, AND METHOD OF PREPARING CATHODE ACTIVE MATERIAL

CROSS-REFERENCE TO RELATED APPLICATION

This application claims priority to and the benefit of Korean Patent Application No. 10-2015-0118875, filed on Aug. 24, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a cathode active material, a cathode and a lithium secondary battery including the cathode active material, and a method of preparing the cathode active material.

2. Description of the Related Art

Lithium secondary batteries have been used as a power source for many portable devices due to their high energy density and ease of design.

Lithium transition metal oxides, such as $LiCoO_2$, $LiNiO_2$, $LiMn_2O_4$, or $LiFePO_4$ have been used as cathode active materials in lithium secondary batteries.

For example, layered $LiCoO_2$ has a reversible capacity of about 200 milliampere-hours per gram (mAh/g) or less, and has reached the limit of increases in the energy density and the power characteristics thereof. $LiNiO_2$, which is also layered, has a larger discharge capacity, but the cycle characteristics thereof are not as good as $LiCoO_2$. Furthermore, when $LiNiO_2$ is used to provide a high energy density battery, the battery may be structurally unstable and prone to failure in the event of structural deformation in a charged state.

Thus the remains a need for a cathode active material having improved structural stability and having improved initial discharge capacity, lifespan characteristics, and voltage stability, in particular for high energy density applications.

SUMMARY

Provided is a cathode active material having improved initial discharging capacity, lifespan characteristics, and voltage maintaining characteristics. Also described is a cathode including the cathode active material and a lithium secondary battery including the cathode.

Provided is a cathode including the cathode active material.

Provided is a lithium secondary battery including the cathode.

Also described is a method of preparing the cathode active material, particularly a method useful in mass production.

According to an aspect, a cathode active material includes a layered lithium transition metal oxide, wherein the layered lithium transition metal oxide includes a metal cation having an oxidation number of +4, wherein the metal cation is disposed in an octahedral site of a lattice of the transition metal oxide.

The cathode active material may be included in a cathode and the cathode may be included in a lithium secondary battery.

According to an aspect, a method of preparing the cathode active material includes combining a metal cation precursor with a transition metal hydroxide precursor to provide a combination; precipitating a transition metal hydroxide including a metal cation having an oxidation number of +4 from the combination; and combining the transition metal hydroxide including the metal cation having an oxidation number of +4 with a lithium precursor to obtain a mixture; and thermally treating the mixture and heating the mixture to prepare the cathode active material.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
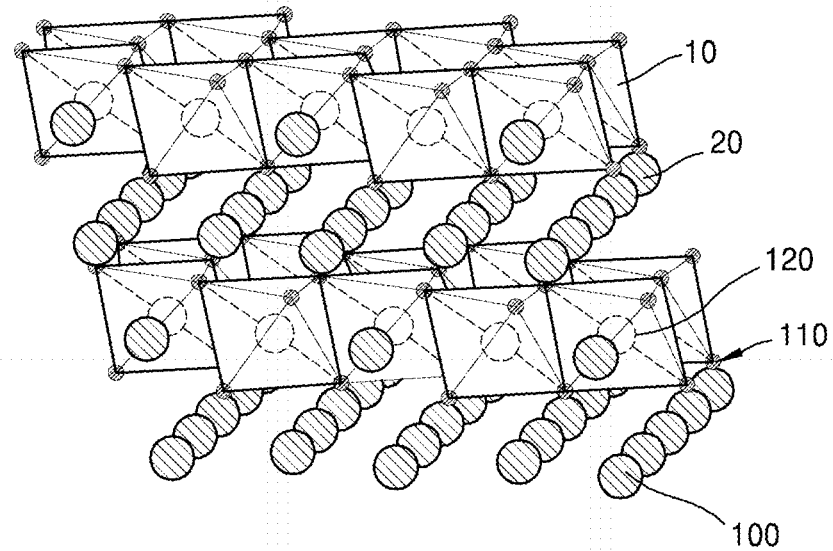
FIG. 1 illustrates a schematic view of a structure of an embodiment of the cathode active material.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," or "at least one selected from," when preceding a list of elements, modify the entire list of elements and do not modify the individual elements of the list.

It will be understood that when an element is referred to as being "on" or "adjacent to" another element, it can be directly on or adjacent to the other element or intervening elements may be present there between. In contrast, when an element is referred to as being "directly on" or "directly adjacent to" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or."

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, with reference to attached drawings, a cathode active material according to an exemplary embodiment, a cathode, and a lithium secondary battery including the cathode active material, and a method of preparing the cathode active material will be described in further detail. However, the drawings are for illustrative purposes only and are not intended to limit the scope of the disclosure.

It will be further understood that the terms "comprises" and/or "comprising" used herein specify the presence of stated features or components, and they do not preclude the presence of one or more other features or components but add the presence thereof.

It will be understood that the term "a combination thereof" used herein means a mixture or combination that is inclusive two or more components.

A layered lithium transition metal oxide may be structurally unstable in an overcharged state, and may undergo an undesirable structural change. Thus, the layered lithium transition metal oxides may only be used in a limited way in high energy density applications. In order to address such a problem, doping or substituting a metal element in the layered lithium transition metal oxide has been attempted.

However, when a metal element doped or substituted in a layered lithium transition metal oxide is non-homogeneously dispersed, it rarely improves the structural stability and electrochemical characteristics of the material.

A cathode active material according to an exemplary embodiment may include a layered lithium transition metal oxide, in which a metal cation having an oxidation number of +4 may be disposed in an octahedral site of the transition metal oxide lattice.

FIG. 1 illustrates an embodiment of a schematic view of a structure of the cathode active material. As shown in FIG. 1, the cathode active material may include a $(Mi)O_6$ layer 10 including an octahedral site in the transition metal oxide lattice, and a Li layer 20, in which the $(Mi)O_6$ layer 10 and the Li layer 20 may be disposed upon one another, e.g., alternately stacked. The (Mi)O$_6$ layer 10 comprises oxygen atoms 110 and transition metal atoms 120, wherein the oxygen octahedrally coordinates the transition metal to provide the octahedral site.

When charging and discharging a battery, the cathode active material may be capable of intercalation/deintercalation of lithium ions from or to the Li layer 20. The (Mi)O$_6$ layer 10 including the octahedral sites and the transition metal oxide lattice may comprise, e.g., be doped with, a metal cation having an oxidation number of +4 at a Mi position, i.e., in the octahedral sites defined by the oxygen atoms 110. Accordingly, the metal cation having an oxidation number of +4 may be homogeneously doped in the particle of the layered lithium transition metal oxide, thereby maintaining the structural stability and improving initial discharging capacity, lifespan characteristics, and voltage holding characteristics.

On the contrary, when a metal cation having an oxidation number of +5 or a metal cation having an oxidation number of +4 and an oxidation number of +5 is doped in the layered lithium transition metal oxide, the metal cation(s) may be non-homogeneously doped on positions other than the (Mi)O$_6$ layer 10 and/or the Mi position of the (Mi)O$_6$ layer 10, causing the structure of the layered lithium transition metal oxide to be unstable. Accordingly, electrochemical characteristics thereof, such as the initial discharging capacity, lifespan characteristics, or voltage maintaining characteristics, may decrease.

The metal cation having an oxidation number of +4 may be at least one of the cations of elements of Group 4, Group 5, Group 14, the lanthanide group of the Periodic Table, and the actinide group of the Periodic Table. In some embodiments, the metal cation having an oxidation number of +4 may be selected from $V^{4+}$, $Zr^{4+}$, $Hf^{4+}$, $Ti^{4+}$, $Pa^{4+}$, $U^{4+}$, $Np^{4+}$, $Pu^{4+}$, $Ce^{4+}$, $Pb^{4+}$, and $Ge^{4+}$. The Mi position of the (Mi)O$_6$ layer 10, i.e., the octahedral sites in the transition metal oxide lattice, may comprise, e.g., be doped with, the metal cation having an oxidation number of +4.

The metal cation having an oxidation number of +4 may be contained in, e.g., doped in, the octahedral sites of the transition metal oxide lattice in an amount of greater than 0 mole percent (mol %) to about 0.0045 mol %, for example, greater than 0 mol % to about 0.0044 mol %, for example, greater than 0 mol % to about 0.0043 mol %, for example, greater than 0 mol % to about 0.0042 mol %, or for example, greater than 0 mol % to about 0.0041 mol %, based on 1 mole of the transition metal oxide. When the metal cation having an oxidation number of +4 is within these ranges, the structure of the layered lithium transition metal oxide may have improved structural integrity, improving initial discharging capacity, lifespan characteristics, and voltage maintaining characteristics.

The layered lithium transition metal oxide may be an overlithiated lithium transition metal oxide. In some embodiments, the layered lithium transition metal oxide may include an overlithiated lithium transition metal oxide represented by Formula 1:

$$Li_{1+x}[M_{1-y}M'_y]O_{2+\alpha}$$ Formula 1 wherein, in Formula 1, $1.1<(1+x)\leq1.6$, $0<y\leq0.0045$, and $0\leq\alpha<1$, M may be at least one transition metal selected from Ni, Co, and Mn, and M' may be at least one metal selected from V, Zr, Hf, Ti, Pa, U, Np, Pu, Ce, Pb, and Ge. In some embodiments, in Formula 1, $1.32\leq(1+x)\leq1.52$. In some embodiments, in Formula 1, M' may be at least one selected from V, Zr, Ti, or for example, in Formula 1, M' may be V.

The overlithiated lithium transition metal oxide represented by Formula 1 may be a high-energy-density cathode active material having large reversible capacity and a high operating voltage, compared with LiCoO$_2$. Since the metal cation having an oxidation number of +4 is doped in the octahedral sites of the transition metal oxide lattice, the overlithiated lithium transition metal oxide, when charging and discharging a battery, may improve the electrical conductivity through an oxidation/reduction, thereby improving the structural stability. In addition, even when charging and discharging a battery with a high voltage (about 4.4 V or more), structural stability may be maintained, thus improving initial discharging capacity, lifespan characteristics, and voltage maintaining characteristics.

The layered lithium transition metal oxide may be a spherical particle. The average particle diameter (D50) of the spherical particle may be in a range of about 1 micrometer (μm) to about 20 μm, or for example, about 1 μm to about 10 μm.

The term "average particle diameter" used herein means a particle size corresponding to 50% in an accumulated particle size distribution curve, a D50, when the total number of particles is 100% in the accumulated particle size distribution curve in which particles are sequentially accumulated in the order of a particle having the smallest size to a particle having the largest size. The D50 may be measured by using any suitable method available in the art such as, a method using a particle size analyzer, or transmission electron microscopy (TEM) or scanning electron microscopy (SEM). Alternatively, for example, after a measurement apparatus such as dynamic light scattering is used, data analysis is performed to count the number of particles for each of the size ranges, which will provide the D50 values.

A surface and the inside of the spherical particle may be doped with the metal cation having an oxidation number of +4. The surface and the inside of the spherical particle may be homogeneously doped with the metal cation having an oxidation number of +4.

The shape of the spherical particle that does not comprise the metal cation having an oxidation number of +4, e.g., before doping the surface and the inside with the metal cation having an oxidation number of +4, may be identical to the shape of the spherical particle comprise the metal cation having an oxidation number of +4, e.g., after the doping.

Accordingly, when the surface and the inside of the spherical particle is doped with the metal cation having an oxidation number of +4 in a cathode active material, the cathode active material may maintain the structural stability thereof without changing the oxidation number of the central metal element and without a change due to transfer of a crystal structure, even when charging and discharging a battery with a high voltage of about 4.4 V or more. Therefore, the initial discharging capacity, lifespan characteristics, and voltage maintaining characteristics thereof may improve.

According to another aspect, a method of preparing a cathode active material may include combining a precursor including the metal cation with a precursor of the transition metal hydroxide at a pH of about 11.0 to about 12.0 to obtain a transition metal hydroxide doped with a metal having an oxidation number of +4. The transition metal hydroxide doped with the metal cation having an oxidation number of +4 is mixed with a lithium precursor and the mixture is thermally treated to prepare the cathode active material. The method of preparing the cathode active material may be easily carried out and may be mass-produced.

The transition metal hydroxide precursor may include at least two transition metal precursors from Groups 7 to 11 of the Periodic Table. For example, the transition metal hydroxide precursor may include at least one selected from a nickel precursor, a cobalt precursor, and a manganese precursor. For example, the nickel precursor may include at least one selected from nickel sulfate, nickel sulfate hydrate, and nickel acetate; the cobalt precursor may include at least one selected from cobalt sulfate, cobalt sulfate hydrate, and cobalt acetate; and the manganese precursor may include at least one selected from manganese sulfate, manganese sulfate hydrate, and manganese acetate.

The metal cation precursor may include at least one selected from $VOSO_4 \cdot xH_2O$ (where $3 \leq x \leq 5$), $Ti(SO_4)_2 \cdot x'H_2O$ (where $3 \leq x' \leq 5$), $Zr(SO_4)_2 \cdot x''H_2O$ (where $3 \leq x \leq "5$), $V(CO_3)_2$, $Ti(CO_3)_2$, and $Zr(CO_3)_2$ For example, the metal cation precursor may be $VOSO_4 \cdot xH_2O$ (where $3 \leq x \leq 5$).

The pH of about 11 to about 12.0 can be achieved by using a base, e.g., NaOH, $NH_4OH$, or KOH, as a pH adjusting agent, to obtain a transition metal hydroxide doped with a metal cation having an oxidation number of +4. The transition metal hydroxide doped with a metal cation having an oxidation number of +4 may precipitate from the mixture and the transition metal hydroxide may be obtained in the form of a dry substance through filtering and/or washing.

The transition metal hydroxide doped with the metal cation having an oxidation number of +4 may include a transition metal hydroxide represented by Formula 2:

$$[(M1)_{1-a}(M'1)_a](OH)_2 \quad \text{Formula 2}$$

wherein, in Formula 2, $0 < a \leq 0.0045$, M1 may be at least one transition metal selected from Ni, Co, and Mn, and M'1 may be at least one metal selected from V, Zr, Hf, Ti, Pa, U, Np, Pu, Ce, Pb, and Ge. For example, in Formula 2, $0 < a \leq 0.0044$, for example, $0 < a \leq 0.0043$, for example, $0 < a \leq 0.0042$, or for example, $0 < a \leq 0.0041$.

In some embodiments, in Formula 2, M'1 may be at least one selected from V, Zr, and Ti, or for example, in Formula 1, M'1 may be V.

Obtaining the transition metal hydroxide doped with the metal cation having an oxidation number of +4 may include stirring a mixture of the metal cation precursor and the transition metal precursor at a temperature of about 40° C. to about 60° C. and at a rate of about 600 revolutions per minute (RPM) to about 1000 RPM. Obtaining the transition metal hydroxide doped with the metal cation having an oxidation number of +4 may include maintaining the pH of the mixture of the metal cation precursor and the transition metal precursor greater than 9, or greater than or equal to 10. The pH may be less than or equal to 12. In some embodiments the pH can be in a range of about 11 to about 12. As described above the pH can be obtained by adding a base to the precursor mixture.

The transition metal hydroxide doped with the metal cation having an oxidation number of +4 is combined with a lithium precursor and thermally treated. The lithium precursor may be, for example, lithium carbonate or the like. Heating (thermally treating) may be performed at a temperature of about 500° C. to about 900° C. The heating may be performed for about 6 hours to about 12 hours. However, the thermal treating time may be determined depending on conditions. The heated cathode active material may be dried and cooled in a furnace. The heating may be carried out under an air atmosphere. However, embodiments are not limited thereto. The heating may be also carried out under an oxidative atmosphere.

When preparing a cathode active material by other methods such as by mixing a transition metal precursor with a lithium precursor in a solid phase, in which the transition metal precursor differs from the lithium precursor, or by mechanically mixing different transition metal elements followed by adding a lithium precursor and heating, metal cations may be non-homogeneously dispersed in particles of the cathode active material due to the difference of dispersion rate among individual elements in a solid phase or a difference in solid solubility. Accordingly, the cathode active material may become structurally unstable, degrading electrochemical characteristics thereof, such as the initial discharging capacity, lifespan characteristics, or voltage maintaining characteristics.

A cathode may include the cathode active material. The cathode may be prepared by, for example, combining the cathode active material, a conductive agent, a binder, and a solvent to prepare a cathode slurry composition. Then, the cathode slurry composition may be directly coated on a cathode current collector and dried to prepare a cathode including a layer including the cathode active material. Alternatively, the cathode slurry composition may be cast on a separate support to form a cathode active material layer, which then may be separated from the support and laminated on the cathode current collector to form a cathode active material layer thereon, thereby forming a cathode.

Non-limiting examples of the conductive agent may include at least one selected from carbon black, graphite particulates, natural graphite, artificial graphite, acetylene black, Ketjen black, carbon fibers; carbon nanotubes; metallic materials, such as copper, nickel, aluminum, silver, and the like, in powder, fiber, or tube form; and a conductive polymer, such as a polyphenylene derivative. Any suitable conductive agent, including those available in the art, may be used.

Non-limiting examples of the binder may include at least one selected from a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer. Non-limiting examples of the solvent may include at least one selected from N-methyl-pyrrolidone (NMP), acetone, and water. Any suitable material available as a solvent, including those known in the art, may be used.

A plasticizer may be further added to the cathode active material composition to form a cathode plate including pores.

The amounts of the cathode active material, the conductive agent, the binder, and the solvent used in the manufacture of the lithium secondary battery can be determined by one of skill in the art without undue experimentation, and thus are not further elaborated for clarity. At least one of the conductive agent, the binder, and the solvent may be omitted if desired, e.g., depending on the use and the structure of the lithium battery.

The cathode may include the cathode active material only. Alternatively, the cathode may further include an additional material for a cathode active material suitable for use in lithium batteries, such as those used in the art, including at least one technical feature, such as a composition or a particle diameter, different from the cathode active material described above.

The lithium containing metal oxide may be any suitable material used in the art, without limitation. In some embodiments, the material for the cathode active material may include at least one composite oxide of at least one metal selected from cobalt, manganese, and nickel, together with lithium. Detailed examples of the material for the cathode active material may include at least one compound represented by one of $Li_aA_{1-b}B'_bD'_2$ (where $0.90 \leq a \leq 1$ and $0 \leq b \leq 0.5$); $Li_aE_{1-b}B'_bO_{2-c}D'_c$ (where $0.90 \leq a \leq 1$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1$, $0 \leq b \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where $0.9 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A is nickel (Ni), cobalt (Co), manganese (Mn), or a combination thereof; B' is aluminum (Al), nickel (Ni), cobalt (Co), manganese (Mn), chromium (Cr), iron (Fe), magnesium (Mg), strontium (Sr), vanadium (V), a rare earth element, or a combination thereof; D' is oxygen (O), fluorine (F), sulfur (S), phosphorus (P), or a combination thereof; E is cobalt (Co), manganese (Mn), or a combination thereof; F' is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

The compounds listed above as cathode active materials may have a surface coating layer (hereinafter, "coating layer"). Alternatively, a mixture of a compound that does not have a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed by using any suitable method that does not adversely affect the physical properties of the cathode active material when a compound of the coating element is used. For example, the coating layer may be formed by using a spray coating method or a dipping method. This may be understood by those of ordinary skill in the art, and thus a detailed description thereof will be omitted.

The cathode current collector may have a thickness of about 3 μm to about 500 μm. The cathode current collector is not particularly limited, and may be any suitable material as long as the cathode current collector has a suitable conductivity without causing undesirable chemical changes in the battery. Examples of the cathode current collector may include at least one selected from copper, stainless steel, aluminum, nickel, titanium, sintered carbon, copper or stainless steel that is surface-treated with carbon, nickel, titanium or silver, and aluminum-cadmium alloys. In addition, the cathode current collector may be processed to have fine unevenness on surfaces thereof so as to enhance the binding strength of a cathode active material to the cathode current collector, and may be used in various suitable forms including films, sheets, foils, nets, porous structures, foams, and non-woven fabrics.

The mixture density of the cathode may be 2.0 grams per cubic centimeter (g/cc) or more.

According to another aspect on the inventive concept, a lithium secondary battery may include the cathode. The lithium secondary battery may include the cathode including the cathode active material; an anode facing the cathode; and an electrolyte between the cathode and the anode.

In the lithium secondary battery, the cathode is prepared as described above.

The anode may be prepared as follows. The anode may be prepared in the same manner as in the method of preparing the cathode, except that an anode active material is used instead of a cathode active material. In addition, a conductive agent, a binder, and a solvent in an anode slurry composition may be the same as in the method of preparing the cathode.

For example, an anode active material, a binder, a solvent, and optionally, a conductive agent may be mixed together to prepare an anode slurry composition. The anode slurry composition may be coated on an anode current collector to prepare an anode. In some embodiments, the anode active material composition may be cast on a separate support to form an anode active material film, which then may be separated from the support and laminated on a current collector to form an anode.

In addition, the anode active material may be any suitable material, including those used in the art as anode active materials of lithium secondary batteries. In some embodiments, the anode active material may include at least one selected from a lithium metal, a metal alloyable with lithium, a transition metal oxide, a non-transition metal oxide, and a carbonaceous material.

Examples of the metal alloyable with lithium include at least one selected from Si, Sn, Al, Ge, Pb, Bi, Sb, a Si—Y' alloy (where Y' may be an alkali metal, an alkali earth metal, a Group 13 and 14 element, a transition metal, a rare earth element, or combinations thereof except for Si), and a Sn—Y' alloy (where Y' is an alkali metal, an alkali earth metal, a Group 13 and 14 element, a transition metal, a rare earth element, or combinations thereof except for Sn). Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may be at least one selected from a lithium titanium oxide, a vanadium oxide, and a lithium vanadium oxide.

For example, the non-transition metal oxide may be $SnO_2$ or $SiO_x$ (where $0 < x < 2$).

The carbonaceous material may be crystalline carbon, amorphous carbon, or combinations thereof. The crystalline carbon may be graphite, such as natural graphite or artificial graphite in non-shaped, plate, flake, spherical or fibrous form. The amorphous carbon may be soft carbon (carbon sintered at low temperatures), hard carbon, mesophase pitch carbides, or sintered corks.

The amounts of the anode active material, the conductive agent, the binder, and the solvent used in the manufacture of the lithium secondary battery are those levels that are generally used in the art.

The anode current collector may have a thickness of about 3 µm to about 500 µm. The anode current collector is not particularly limited, and may be any suitable material as long as it has a suitable conductivity without causing undesirable chemical changes in the battery. Examples of the anode current collector include at least one selected from copper, stainless steel, aluminum, nickel, titanium, sintered carbon, copper or stainless steel that is surface-treated with carbon, nickel, titanium or silver, and aluminum-cadmium alloys. In addition, the anode current collector may be processed to have fine unevenness on surfaces thereof so as to enhance the binding strength of a cathode active material to the negative electrode current collector, and may be used in various suitable forms including films, sheets, foils, nets, porous structures, foams, and non-woven fabrics.

In some embodiments, the cathode and the anode may be separated from each other by a separator. Any suitable separator, including any separator that is commonly used in lithium batteries may be used. Particularly, the separator may have low resistance to migration of ions in an electrolyte and have electrolytic solution-retaining ability. Examples of the separator may include at least one selected from glass fiber, polyester, polyethylene, polypropylene, polytetrafluoroethylene (PTFE), and a combination thereof, each of which may be a nonwoven fabric or a woven fabric. The separator may have a pore diameter of about 0.01 µm to about 10 µm and a thickness of about 5 µm to about 300 µm.

The electrolyte may be a lithium salt-containing non-aqueous electrolyte. A lithium salt-containing non-aqueous electrolyte may include a non-aqueous electrolyte solution and lithium. The non-aqueous electrolyte may include a non-aqueous electrolyte solution, an organic solid electrolyte, or an inorganic solid electrolyte.

Examples of the non-aqueous electrolyte solution include at least one selected from an aprotic organic solvent, such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, triester phosphate, trimethoxymethane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may include at least one selected from a polyethylene derivative, a polyethylene oxide derivative, a polypropylene oxide derivative, a phosphate ester polymer, a poly(L-lysine), a polyester sulfide, a polyvinyl alcohol, a polyvinylidene fluoride, and a polymer including an ionic dissociation group.

Examples of the inorganic solid electrolyte may include at least one selected from a Li nitride, e.g., $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$, a halide, and a sulfate.

The lithium salt may be any suitable lithium salt, including those commonly used in lithium secondary batteries, and easily dissolvable in the non-aqueous electrolyte. The lithium salt may be at least one selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, a lower aliphatic lithium carboxylate, lithium tetraphenyl borate, and imide.

Lithium secondary batteries may be classified into lithium ion batteries, lithium ion polymer batteries, and lithium polymer batteries according to the type of the separator and electrolyte. In addition, lithium batteries may be classified into a cylindrical type, a rectangular type, a coin type, and a pouch type according to the shape of the battery, and may also be classified into a bulk type and a thin film type according to the size of the battery.

Methods of manufacturing these lithium batteries are widely known in the art, so a detailed description thereof will not be recited here.

Figure 2:
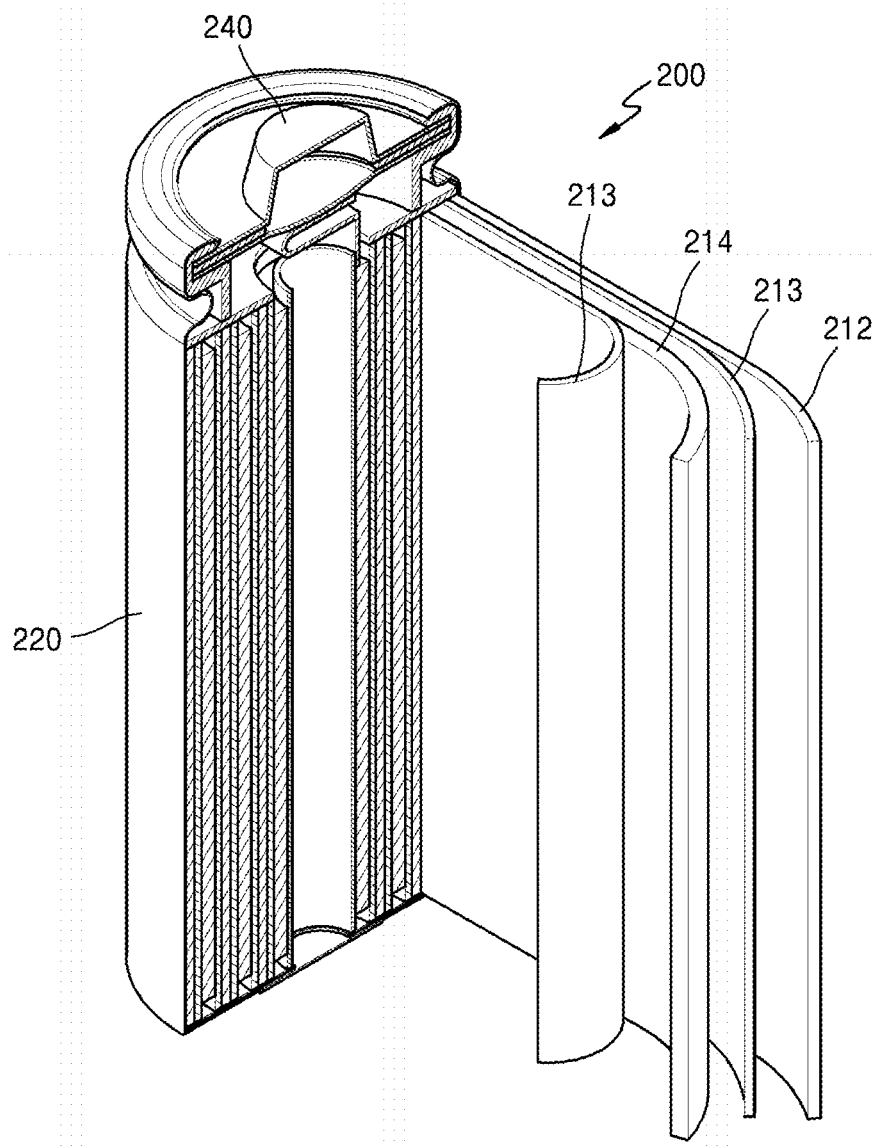
FIG. 2 illustrates a schematic view of an embodiment of a structure of a lithium secondary battery.

FIG. 2 illustrates an embodiment of a schematic view of a structure of a lithium secondary battery 200.

Referring to FIG. 2, the lithium secondary battery 200 may include a cathode 214, a separator 213, and an anode 212. The cathode 214, the separator 213, and the anode 212 of the lithium secondary battery 200 may be wound or folded and be accommodated in a battery case 220. Then, the battery case 220 may be filled with an organic electrolyte and sealed by a sealing member 240, thereby completing the manufacture of the lithium battery 200. The battery case 220 may be a cylindrical type, a rectangular type, or a thin-film type. For example, the lithium secondary battery 200 may be a large thin-film type battery. For example, the lithium secondary battery 200 may be a lithium ion battery.

The separator 213 may be between the cathode 214 and the anode 212 to constitute a battery assembly. The battery assembly may be stacked in a bi-cell structure and impregnated with an electrolyte solution, and put into a pouch and hermetically sealed, thereby completing the manufacture of a lithium ion polymer battery.

Alternatively, a plurality of battery assemblies may be stacked upon one another to form a battery pack, which may be used in any device that operates at high temperatures and requires high power, for example, in a laptop computer, a smart phone, a power tool, or an electric vehicle.

The lithium secondary battery 200 may have improved storage-stability at a high temperature, high-rate characteristics, and lifespan characteristics, and thus may be applicable in an electric vehicle (EV). For example, the lithium secondary battery 200 may be applicable in a hybrid vehicle, such as a plug-in hybrid electric vehicle (PHEV).

Hereinafter, Examples and Comparative Examples will be described in detail. However, the Examples are for illustrative purpose only, and are not intended to limit the scope of the inventive concept.

EXAMPLES

Example 1: Preparation of Cathode Active Material

A 2 molar (M) nickel sulfate aqueous solution ($NiSO_4.6(H_2O)$, available from Aldrich Co., Ltd), a 2M cobalt sulfate aqueous solution ($CoSO_4.7(H_2O)$, available from Aldrich Co., Ltd), and a 2M manganese sulfate aqueous solution ($MnSO_4.X(H_2O)$), available from Aldrich Co., Ltd), were mixed with each other to prepare a first mixture solution having a mole ratio of nickel to cobalt to manganese of 0.225 to 0.15 to 0.625. A 2M vanadium oxide sulfate aqueous solution ($VOSO_4.x(H_2O)$, where $3 \leq x \leq 5$, available from Aldrich Co., Ltd) was mixed with the first mixture solution to prepare a second mixture solution having a mole ratio of nickel, cobalt, and manganese in the first mixture solution as a whole to vanadium of 0.9970 to 0.0030.

The second mixture solution and a 2M $Na_2CO_3$ aqueous solution were added to 4 liters (L) of a 0.2M $NH_4OH$ solution at a stirring rate of about 800 revolutions per minute (RPM) and reacted at a temperature of about 50° C. at a pH of 11.5 for 10 hours, and then followed by precipitation. $[(Ni_{0.225}Co_{0.15}Mn_{0.625})_{0.9970}V_{0.0030}](OH)_2$, which is doped with $V^{4+}$ ions was obtained.

$Li_2CO_3$ (available from Aldrich Co., Ltd) and 4 weight percent (wt %), which is based on the total lithium weight, of LiF (available from Aldrich Co., Ltd) were mixed with $[(Ni_{0.225}Co_{0.15}Mn_{0.625})_{0.9970}V_{0.0030}](OH)_2$, which is doped with $V^{4+}$ ions to have a mole ratio of Li of 1.48, based on the cathode active material, and then followed by heating at a temperature of 700° C. under an air atmosphere for about 10 hours, thereby preparing a $Li_{1.48}[(Ni_{0.225}Co_{0.15}Mn_{0.625})_{0.9970}V_{0.0030}]O_2$ cathode active material.

Example 2: Preparation of Cathode Active Material

A 2M vanadium oxide sulfate aqueous solution ($VOSO_4 \cdot xH_2O$), where $3 \leq x \leq 5$, (available from Aldrich Co., Ltd) was mixed with the first mixture solution prepared in Example 1 to prepare a second mixture solution having a mole ratio of nickel, cobalt, and manganese in the first mixture solution as a whole to vanadium of 0.9969 to 0.0031, instead of 0.9970 to 0.0030, thereby obtaining $[(Ni_{0.225}Co_{0.15}Mn_{0.625})_{0.9969}V_{0.0031}](OH)_2$, which is doped with $V^{4+}$ ions.

A $Li_{1.51}[(Ni_{0.225}Co_{0.15}Mn_{0.625})_{0.9969}V_{0.0031}]O_2$ cathode active material was prepared in the same manner as in Example 1, except that $[(Ni_{0.225}Co_{0.15}Mn_{0.625})_{0.9969}V_{0.0031}](OH)_2$, which is doped with $V^{4+}$ ions had a mole ratio of Li of 1.51 instead of 1.48, based on the cathode active material.

Example 3: Preparation of Cathode Active Material

A 2M vanadium oxide sulfate aqueous solution ($VOSO_4 \cdot xH_2O$), where $3 \leq x \leq 5$, (available from Aldrich Co., Ltd) was mixed with the first mixture solution prepared in Example 1 to prepare a second mixture solution having a mole ratio of nickel, cobalt, and manganese as a whole to vanadium of 0.9975 to 0.0025, instead of 0.9970 to 0.0030, thereby obtaining $[(Ni_{0.225}Co_{0.15}Mn_{0.625})_{0.9975}V_{0.0025}](OH)_2$, which is doped with $V^{4+}$ ions.

A $Li_{1.51}[(Ni_{0.225}Co_{0.15}Mn_{0.625})_{0.9975}V_{0.0025}]O_2$ cathode active material was prepared in the same manner as in Example 1, except that $[(Ni_{0.225}Co_{0.15}Mn_{0.625})_{0.9975}V_{0.0025}](OH)_2$, which is doped with $V^{4+}$ ions had a mole ratio of Li of 1.51 instead of 1.48, based on the cathode active material.

Example 4: Preparation of Cathode Active Material

A 2M nickel sulfate aqueous solution ($NiSO_4 \cdot 6H_2O$), available from Aldrich Co., Ltd) a 2M cobalt sulfate aqueous solution ($CoSO_4 \cdot 7H_2O$), available from Aldrich Co., Ltd) and a 2M manganese sulfate aqueous solution ($MnSO_4 \cdot xH_2O$), available from Aldrich Co., Ltd) were mixed with each other to prepare a first mixture solution having a mole ratio of nickel to cobalt to manganese of 0.25 to 0.10 to 0.65. A 2M vanadium oxide sulfate aqueous solution ($VOSO_4 \cdot xH_2O$), where $3 \leq x \leq 5$, available from Aldrich Co., Ltd) was mixed with the first mixture solution to prepare a second mixture solution having a mole ratio of nickel, cobalt, and manganese as a whole to vanadium of 0.9981 to 0.0019.

The second mixture solution and a 2M $Na_2CO_3$ aqueous solution were together added to 4 L of a 0.2M $NH_4OH$ solution at a stirring rate of about 800 RPM and reacted at a temperature of about 50° C. at a pH of 11.5 for 10 hours, and then followed by precipitation. $[(Ni_{0.25}Co_{0.10}Mn_{0.65})_{0.9981}V_{0.0019}](OH)_2$, which is doped with $V^{4+}$ ions was obtained.

$Li_2CO_3$ (available from Aldrich Co., Ltd) and 4 wt %, which is based on the total lithium weight, of LiF (available from Aldrich Co., Ltd) were mixed with $[(Ni_{0.25}Co_{0.10}Mn_{0.65})_{0.9981}V_{0.0019}](OH)_2$, which is doped with $V^{4+}$ ions to have a mole ratio of Li of 1.32, based on the cathode active material, and then followed by heating at a temperature of 700° C. under an air atmosphere for about 10 hours, thereby preparing a $Li_{1.32}[(Ni_{0.25}Co_{0.10}Mn_{0.65})_{0.9981}V_{0.0019}]O_2$ cathode active material.

Example 5: Preparation of Cathode Active Material

A $Li_{1.32}[(Ni_{0.25}Co_{0.10}Mn_{0.65})_{0.996}V_{0.0036}]O_2$ cathode active material was prepared in the same manner as in Example 4, except that a 2M vanadium oxide sulfate aqueous solution ($VOSO_4 \cdot xH_2O$), where $3 \leq x \leq 5$, available from Aldrich Co., Ltd) was mixed with the first mixture solution prepared in Example 4 to prepare a second mixture solution having a mole ratio of nickel, cobalt, and manganese as a whole to vanadium of 0.9964 to 0.0036, instead of 0.9981 to 0.0019, thereby obtaining $[(Ni_{0.25}Co_{0.10}Mn_{0.65})_{0.9964}V_{0.0036}](OH)_2$, which is doped with $V^{4+}$ ions.

Comparative Example 1: Preparation of Cathode Active Material

A 2M nickel sulfate aqueous solution ($NiSO_4 \cdot 6H_2O$), available from Aldrich Co., Ltd), a 2M cobalt sulfate aqueous solution ($CoSO_4 \cdot 7H_2O$), available from Aldrich Co., Ltd), and a 2M manganese sulfate aqueous solution ($MnSO_4 \cdot H_2O)_x$, available from Aldrich Co., Ltd), were mixed with each other to prepare a solution having a mole ratio of nickel to cobalt to manganese of 0.225 to 0.15 to 0.625.

The solution and a 4M NaOH aqueous solution were together added to 4 L of a 1M $NH_4OH$ solution at a stirring rate of about 800 RPM and reacted at a temperature of about 50° C. at a pH of 11.5 for 10 hours, and then followed by precipitation. $[(Ni_{0.225}Co_{0.15}Mn_{0.625})](OH)_2$ was obtained.

$Li_2CO_3$ (available from Aldrich Co., Ltd) and 4 wt %, which is based on the total lithium weight, of LiF (available from Aldrich Co., Ltd) were mixed with $[(Ni_{0.225}Co_{0.15}Mn_{0.625})](OH)_2$ to have a mole ratio of Li of 1.48, based on the cathode active material, and then followed by heating at a temperature of 700° C. under an air atmosphere for about 10 hours, thereby preparing a $Li_{1.48}[(Ni_{0.225}Co_{0.15}Mn_{0.625})]O_2$ cathode active material.

Comparative Example 2: Preparation of Cathode Active Material

A $Li_{1.51}[(Ni_{0.225}Co_{0.15}Mn_{0.625})]O_2$ cathode active material was prepared in the same manner as in Comparative Example 1, except that $Li_2CO_3$ (available from Aldrich Co., Ltd) and 4 wt %, which is based on the total lithium weight, of LiF (available from Aldrich Co., Ltd) were mixed with $[(Ni_{0.225}Co_{0.15}Mn_{0.625})](OH)_2$ of Comparative Example 1 to have a mole ratio of Li of 1.51 instead of 1.48, based on the cathode active material.

Comparative Example 3: Preparation of Cathode Active Material

Vanadium acetylacetonate ($V(C_5H_7O_2)_3$) was added to 300 milliliters (mL) of ethanol to prepare a coating solution.

[$Ni_{0.25}Co_{0.1}Mn_{0.625}$](OH)$_2$ transition metal hydroxide was added to the coating solution to have a mole ratio of nickel, cobalt, and manganese, as a whole, to vanadium of 0.995 to 0.005, and then followed by stirring for about 10 hours. While stirring, ethanol was evaporated to obtain transition metal hydroxide coated with vanadium cations.

$Li_2CO_3$ (available from Aldrich Co., Ltd) and 4 wt %, which is based on the total lithium weight, of LiF (available from Aldrich Co., Ltd) were mixed with the coated transition metal hydroxide to have a mole ratio of Li of 1.40, based on the cathode active material, and then followed by heating at a temperature of about 700° C. under an air atmosphere for about 10 hours, thereby preparing a core-shell cathode active material of which a surface was coated with vanadium cations.

Comparative Example 4: Preparation of Cathode Active Material

A 2M vanadium oxide sulfate aqueous solution ($VOSO_4 \cdot x$ ($H_2O$), where $3 \leq x \leq 5$, available from Aldrich Co., Ltd), was mixed with the first mixture solution prepared in Example 1 to prepare a second mixture solution having a mole ratio of nickel, cobalt, and manganese as a whole to vanadium of 0.995 to 0.005, instead of 0.9970 to 0.0030, thereby obtaining [$(Ni_{0.225}Co_{0.15}Mn_{0.625})_{0.995}V_{0.005}$](OH)$_2$, which is doped with $V^{4+}$ ions.

A $Li_{1.51}$[$(Ni_{0.225}Co_{0.15}Mn_{0.625})_{0.995}V_{0.005}$]$O_2$ cathode active material was prepared in the same manner as in Example 1, except that [$(Ni_{0.225}Co_{0.15}Mn_{0.625})_{0.995}V_{0.005}$](OH)$_2$, which is doped with $V^{4+}$ ions had a mole ratio of Li of 1.51 instead of 1.48, based on the cathode active material.

Comparative Example 5: Preparation of Cathode Active Material

A 2M vanadium oxide sulfate aqueous solution ($VOSO_4 \cdot x$ ($H_2O$), where $3 \leq x \leq 5$, available from Aldrich Co., Ltd), was mixed with the first mixture solution prepared in Example 1 to prepare a second mixture solution having a mole ratio of nickel, cobalt, and manganese as a whole to vanadium of 0.99 to 0.01, instead of 0.9970 to 0.0030, thereby obtaining [$(Ni_{0.225}Co_{0.15}Mn_{0.625})_{0.99}V_{0.001}$](OH)$_2$, which is doped with $V^{4+}$ ions.

A $Li_{1.51}$[$(Ni_{0.225}Co_{0.15}Mn_{0.625})_{0.99}V_{0.01}$]$O_2$ cathode active material was prepared in the same manner as in Example 1, except that [$(Ni_{0.225}Co_{0.15}Mn_{0.625})_{0.99}V_{0.01}$](OH)$_2$, which is doped with $V^{4+}$ ions had a mole ratio of Li of 1.51 instead of 1.48, based on the cathode active material.

Hereinafter, compositions of the cathode active materials prepared in Examples 1 to 5, and Comparative Examples 1 to 5 are as in Table 1.

TABLE 1

| Example | Compositions of cathode active materials |
| --- | --- |
| Example 1 | $Li_{1.48}$[$(Ni_{0.225}Co_{0.15}Mn_{0.625})_{0.9970}V_{0.0030}$]$O_2$ |
| Example 2 | $Li_{1.51}$[$(Ni_{0.225}Co_{0.15}Mn_{0.625})_{0.9969}V_{0.0031}$]$O_2$ |
| Example 3 | $Li_{1.51}$[$(Ni_{0.225}Co_{0.15}Mn_{0.625})_{0.9975}V_{0.0025}$]$O_2$ |
| Example 4 | $Li_{1.32}$[$(Ni_{0.25}Co_{0.10}Mn_{0.65})_{0.9981}V_{0.0019}$]$O_2$ |
| Example 5 | $Li_{1.32}$[$(Ni_{0.25}Co_{0.10}Mn_{0.65})_{0.9964}V_{0.0036}$]$O_2$ |
| Comparative Example 1 | $Li_{1.48}$[$Ni_{0.225}Co_{0.15}Mn_{0.625}$]$O_2$ |
| Comparative Example 2 | $Li_{1.51}$[$Ni_{0.225}Co_{0.15}Mn_{0.625}$]$O_2$ |
| Comparative Example 3 | $Li_{1.40}$[$(Ni_{0.25}Co_{0.10}Mn_{0.65})_{0.995}V_{0.005}$]$O_2$ |
| Comparative Example 4 | $Li_{1.51}$[$(Ni_{0.225}Co_{0.15}Mn_{0.625})_{0.995}V_{0.005}$]$O_2$ |
| Comparative Example 5 | $Li_{1.51}$[$(Ni_{0.225}Co_{0.15}Mn_{0.625})_{0.99}V_{0.01}$]$O_2$ |

Example 6: Preparation of Lithium Secondary Battery (Coin-Cell)

The cathode active material prepared in Example 1, a conductive agent (acetylene black, Denka black), and a binder, in which 3 wt % of polyvinylidene fluoride (PVdF) was dissolved in N-methyl-pyrrolidone (NMP), were added to an agate mortar at a weight ratio of 92:4:4 and mixed with each other to prepare a slurry. The slurry was bar-coated on an aluminum foil to have a thickness of about 15 µm. The result was placed in an oven at a temperature of about 90° C., for about 2 hours to evaporate NMP, placed in a vacuum oven at a temperature of about 120° C., and further dried for about 2 hours to completely evaporate NMP. The coated aluminum foil electrode was pressed and punched, thereby preparing a coin-cell cathode having a thickness of about 60 µm. The capacity of the coin-cell cathode was about 2.3 mAh/cm$^2$, and the thickness thereof was in a range of about 50 µm to about 60 µm.

A coin-type lithium half-cell (CR2032 type) having a diameter of about 12 millimeters (mm) was prepared using the cathode.

In the preparation of the cell, metal lithium was used as a counter electrode, a lithium salt, in which 1.1M $LiPF_6$ and 0.2M $LiBF_4$ were dissolved in a mixture solvent of ethylene carbonate (EC), diethyl carbonate (DEC), and fluoroethylene carbonate (FEC) (having a volume ratio of about 2:6:2), was used as an electrolyte, and a microporous membrane (available from Teijin, Co., Ltd) including a polyethylene member coated with PVdF was used as a separator.

Example 7 to 10: Preparation of Lithium Secondary Battery (Coin-Cell)

Coin-type lithium half-cells (CR2032 type) were prepared in the same manner as in Example 6, except that the cathode active materials of Examples 2 to 5 were used, respectively, instead of the cathode active material of Example 1.

Comparative Examples 6 to 10: Preparation of Lithium Secondary Battery (Coin-Cell)

Coin-type lithium half-cells (CR2032 type) were prepared in the same manner as in Example 6, except that the cathode active materials of Comparative Examples 1 to 5 were used, respectively, instead of the cathode active material of Example 1.

Analysis Example 1: X-Ray Photoelectron Spectroscopy (XPS) Analysis

XPS analysis was performed on the cathode active materials prepared in Examples 1 and 2 and Comparative Examples 1 and 2. The XPS analysis was carried out using Quantum 2000 (available from Physical Electronics. Inc.) (an acceleration voltage of about 0.5 keV to about 15 keV, 300 W, an energy resolution of about 1.0 eV, a minimum analyzing area of about 10 micro, and a sputter rate of about 0.1 nm/min). The results of Ni2p, Co2p, Mn2p, and V2p XPS analysis of the cathode active materials prepared in Examples 1 and 2 and Comparative Examples 1 and 2 are shown in FIGS. 3A to 3D, respectively.

Figure 3A:
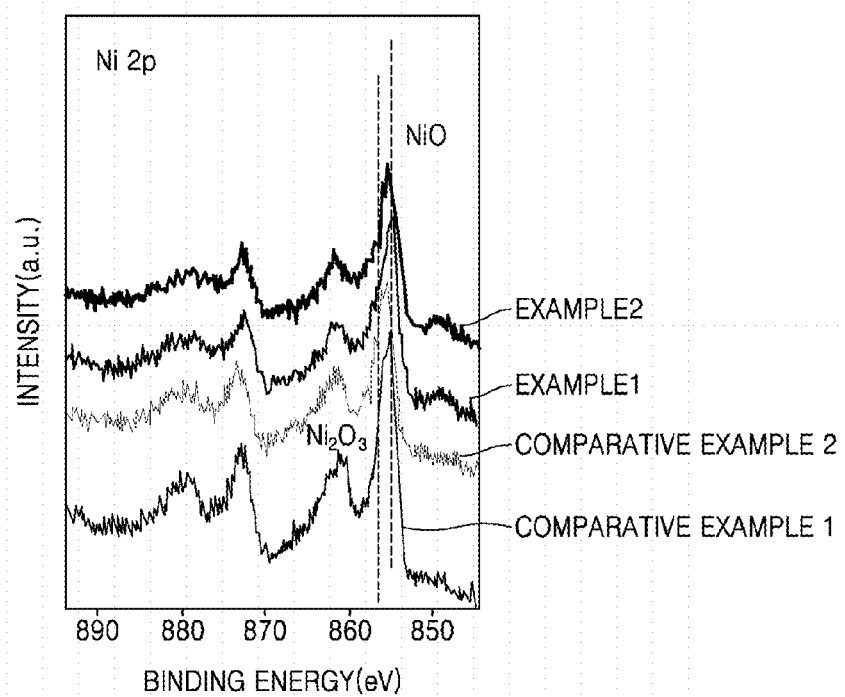
FIGS. 3A to 3D are each a graph of intensity (arbitrary units, a.u.) versus binding energy (electron volts, eV) illustrating Ni2p, Co2p, Mn2p, and V2p spectra, respectively, obtained by performing X-ray photoelectron spectroscopy (XPS) analysis on the cathode active materials prepared in Examples 1 and 2 and Comparative Examples 1 and 2.
Figure 3B:
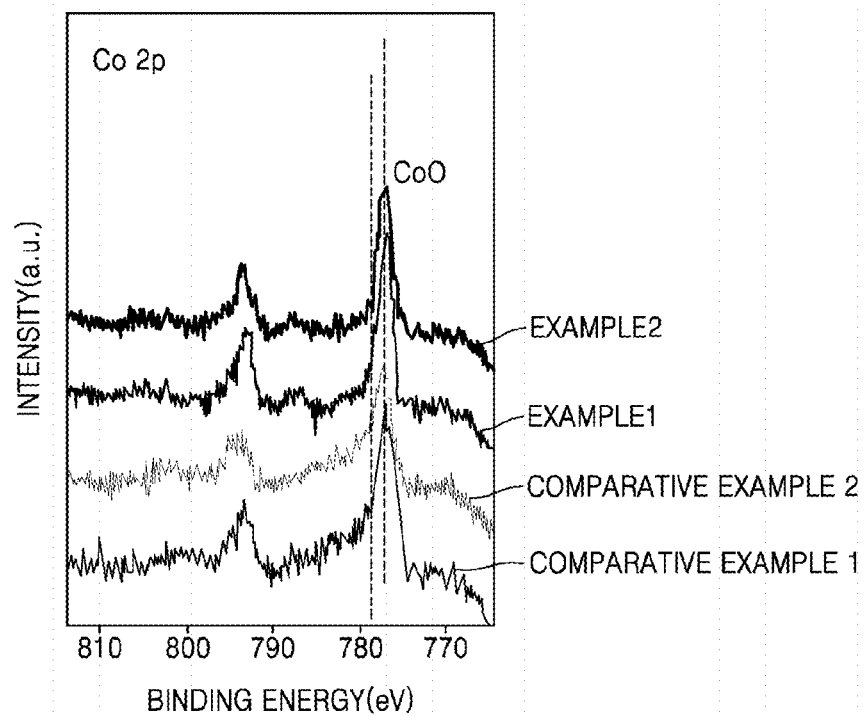
Figure 3C:
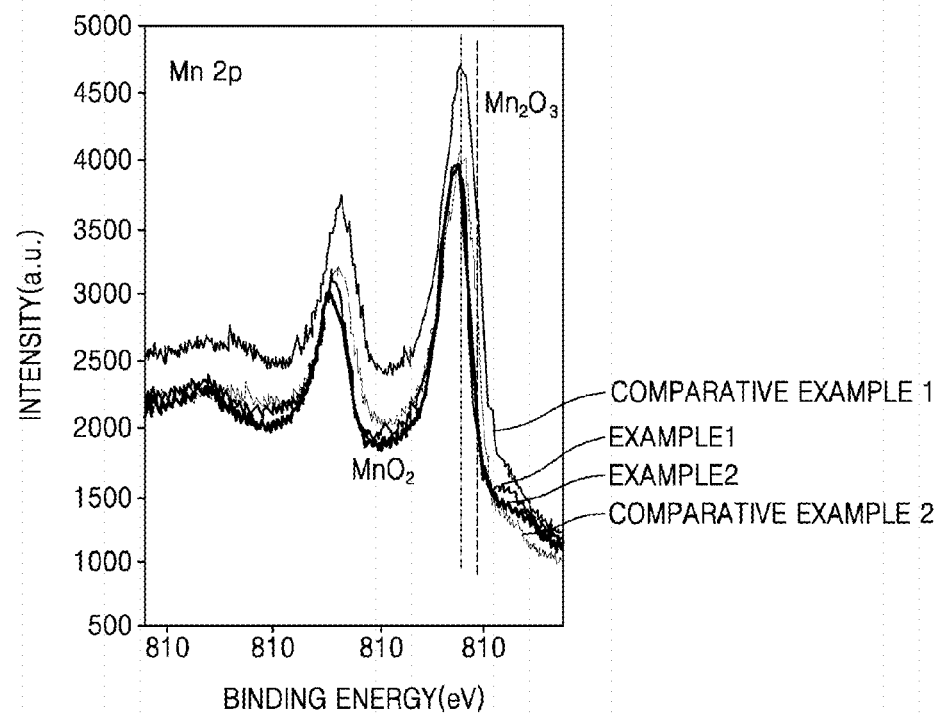

Referring to FIGS. 3A to 3C, in the Ni2p spectrum, a peak of the binding energy of the cathode active materials prepared in Examples 1 and 2 and Comparative Examples 1 and 2 was observed in a range of about 852 electron volt (eV) to about 857 eV, in the Co2p spectrum, a peak of the binding energy of the cathode active materials prepared in Examples 1 and 2 and Comparative Examples 1 and 2 was observed in a range of about 778 eV to about 783 eV, and in the Mn2p spectrum, a peak of the binding energy of the cathode active materials prepared in Examples 1 and 2 and Comparative Examples 1 and 2 was observed in a range of about 640 eV to about 645 eV.

It was found that regardless whether a layered lithium transition metal oxide lattice in the cathode active materials prepared in Examples 1 and 2 and Comparative Examples 1 and 2 is doped with vanadium cations or not, the oxidation number of Ni was still +2, the oxidation number of Co was still +3, and the oxidation number of Mn was still +4. Accordingly, it was found that the layered lithium transition metal oxide lattice structure was maintained.

Figure 3D:
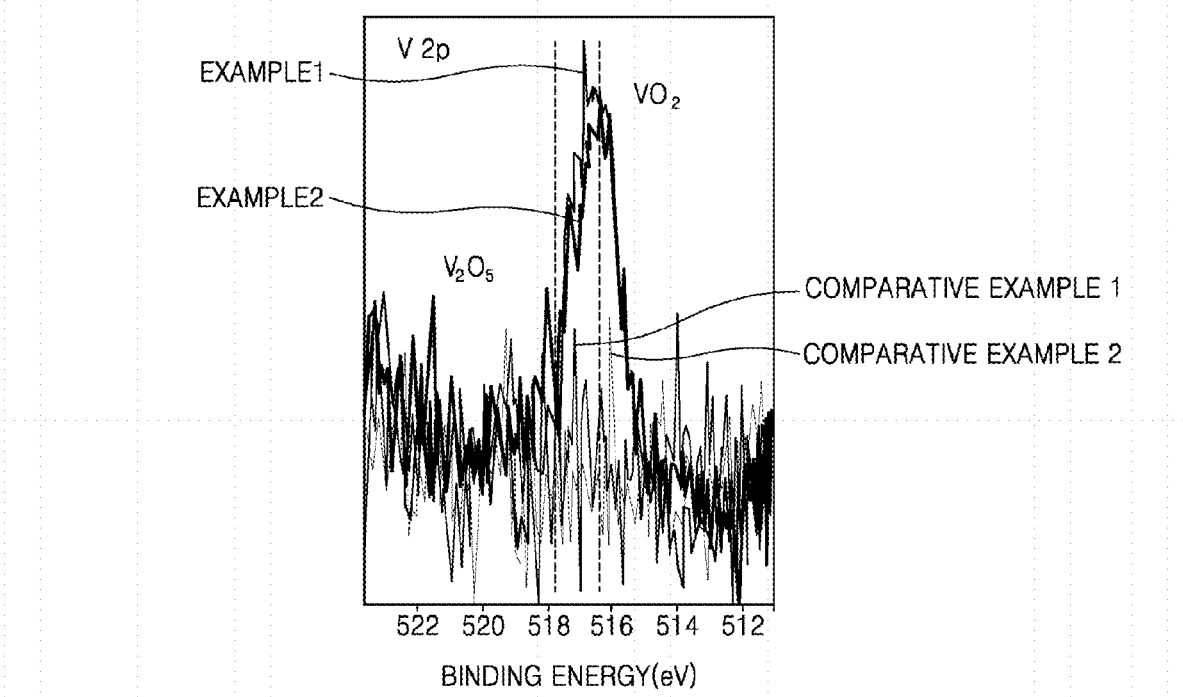

Referring to FIG. 3D, in the V2p spectrum, a peak of the binding energy of the cathode active materials prepared in Examples 1 and 2 was observed in a range of about 516 eV to about 518 eV. However, in the V2p spectrum, a peak of the binding energy of the cathode active materials prepared in Comparative Examples 1 and 2 was not observed in a range of about 516 eV to about 518 eV.

Figure 4A:
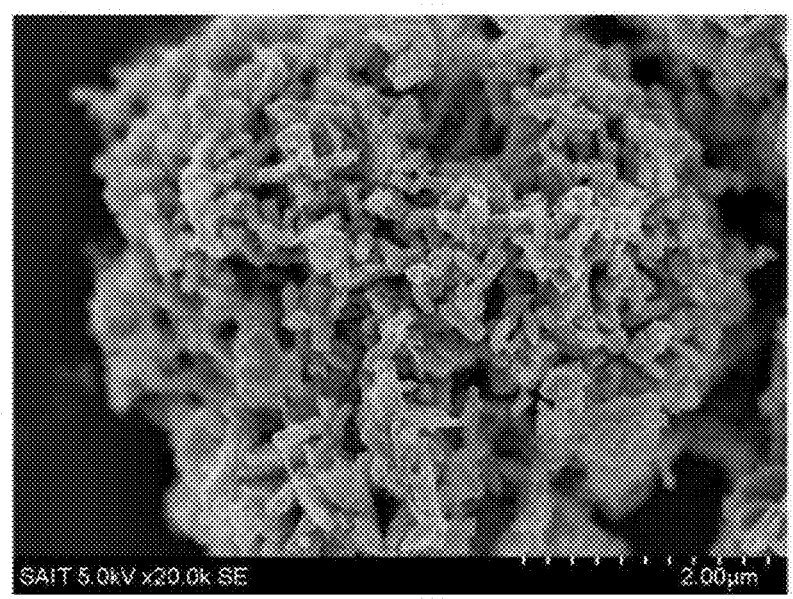
FIGS. 4A to 4D each illustrate SEM analysis images showing the shape of a transition metal hydroxide particle doped with $V^{4+}$ ions obtained in Example 1, a transition metal hydroxide particle not doped with $V^{4+}$ ions prepared in Comparative Example 1, a cathode active material particle prepared in Example 1, and the cathode active material particle prepared in Comparative Example 1, respectively.
Figure 4B:
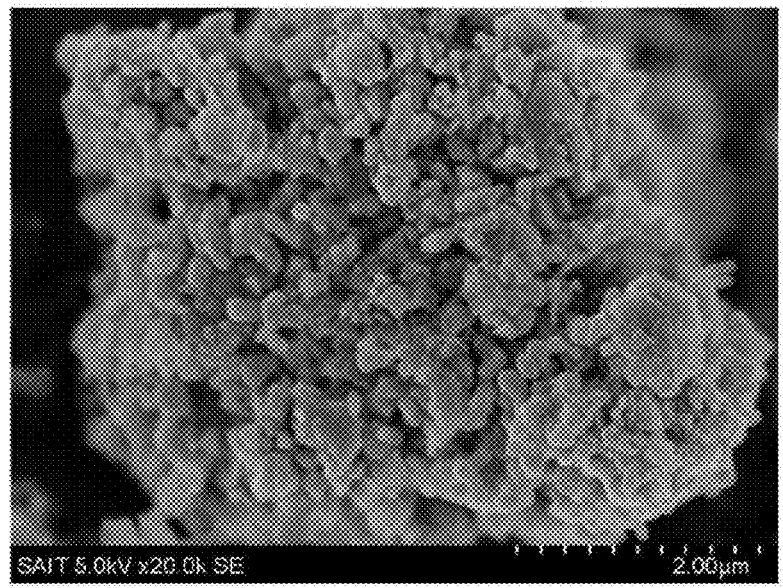
Figure 4C:
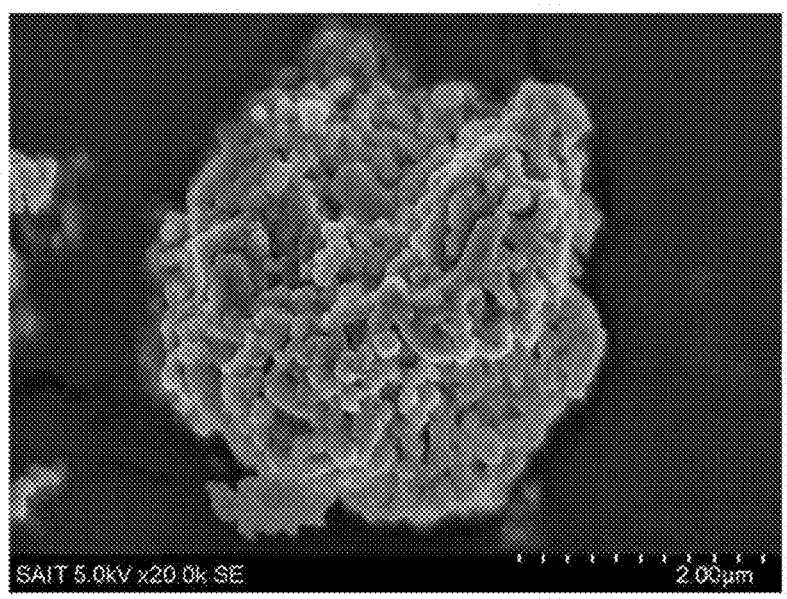
Figure 4D:
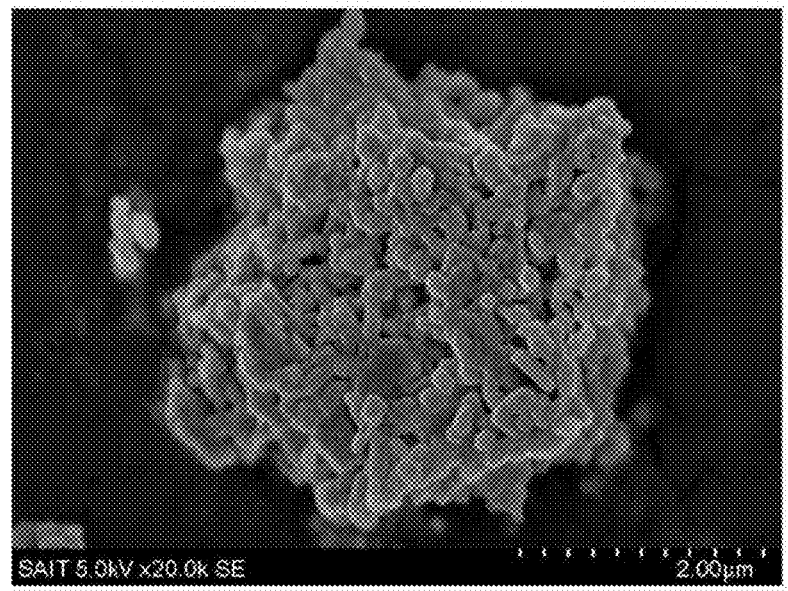

Referring to FIGS. 4C and 4D, it was found that the shape of the cathode active material particle was the same regardless of whether the layered lithium transition metal oxide lattice is doped with $V^{4+}$ ions or not. The cathode active materials particle prepared in Example 1 and Comparative Example 1 are each a spherical secondary particle, and the average particle diameter (D50) was about 4 μm.

1.2. Analysis of Distribution of Vanadium Elements on Surface of and Inside Cathode Active Material Particle Surface SEM-EDS analysis and ICP-AES analysis were performed on a surface of and inside of the cathode active material particle prepared in Example 2 and the cathode active material particle prepared in Comparative Example 3 to analyze the distribution of vanadium elements. SEM-EDS analysis was performed using NovaNano SEM 450 (available from FEI Co., Ltd), and ICP-AES analysis was performed using ICPS-8100 (available from SHIMADZU Co., Ltd).

Figure 5A:
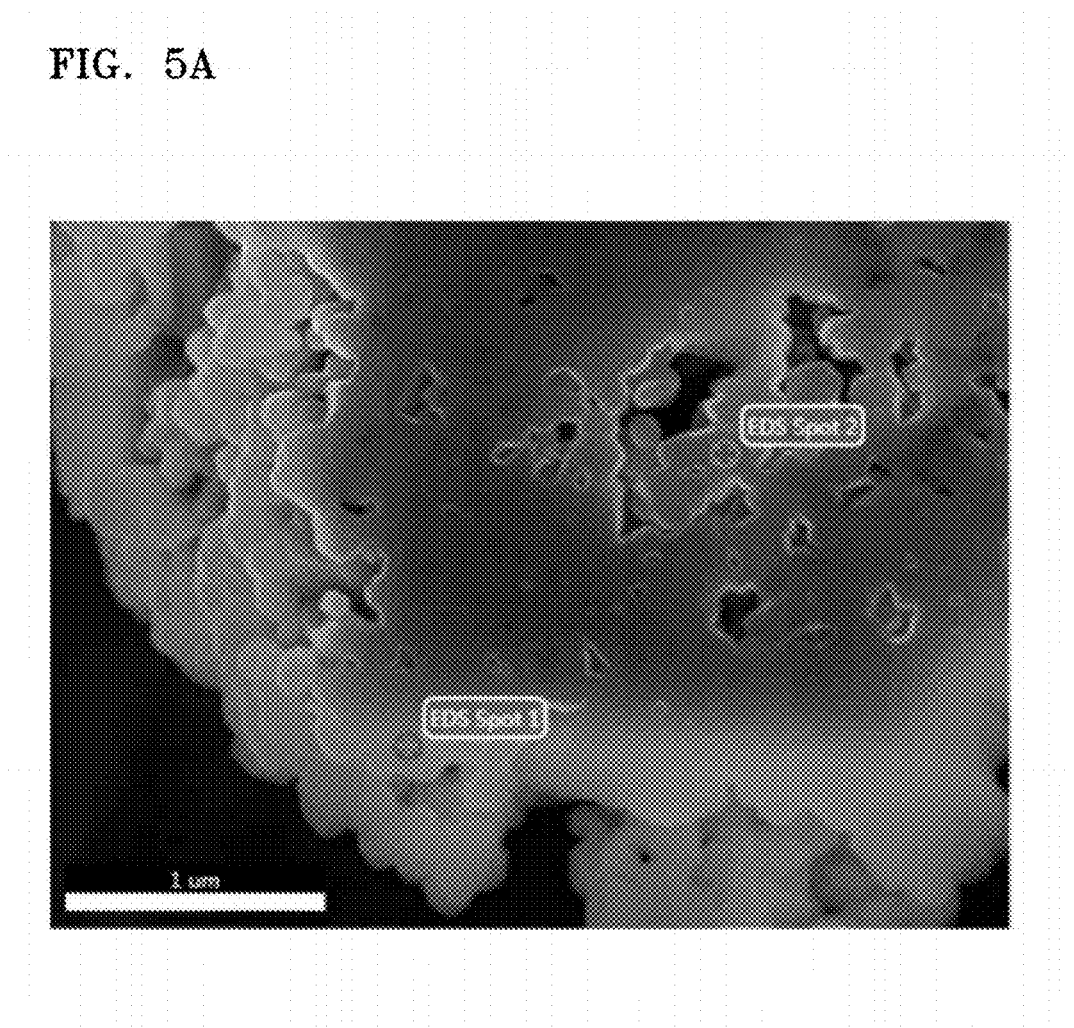
FIGS. 5A and 5D illustrate a scanning electron microscopy (SEM) images of a cathode active material particle prepared in Example 2, and a cathode active material particle prepared in Comparative Example 3, respectively.
Figure 5B:
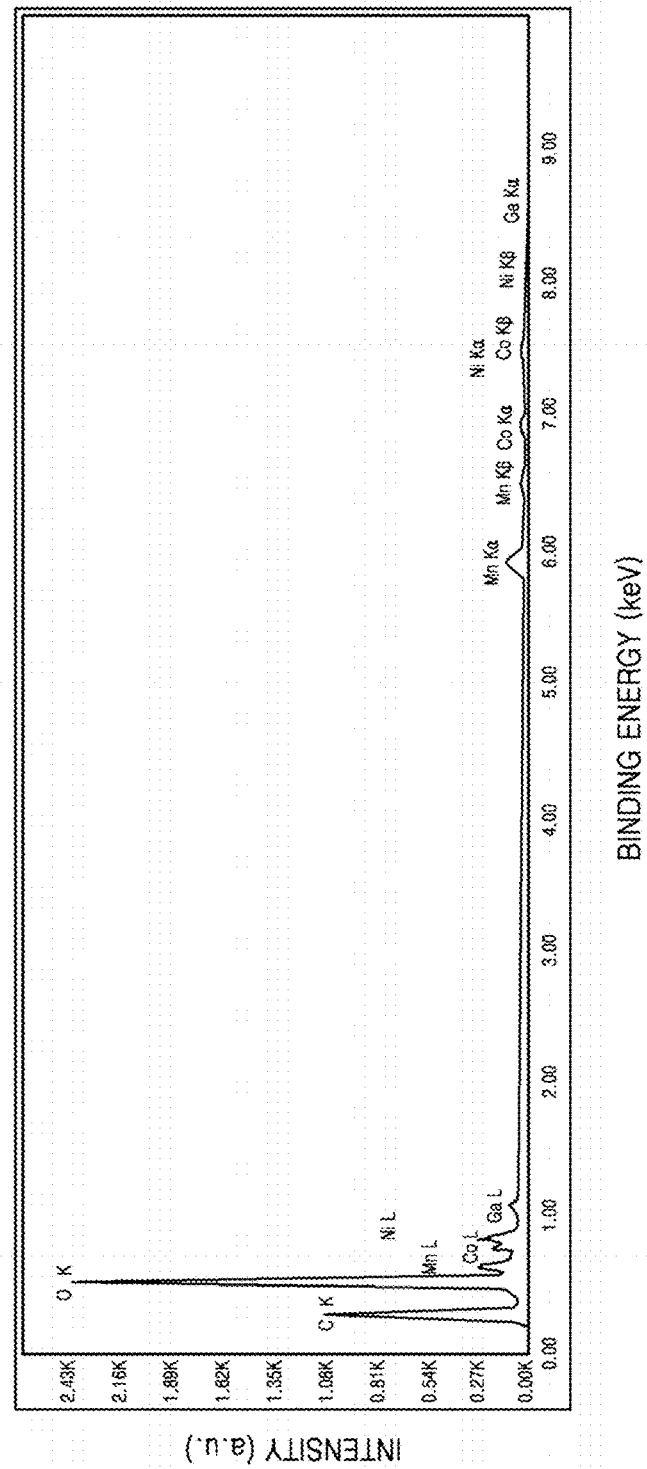
FIGS. 5B, 5C, 5E, and 5F are each a graph of intensity (arbitrary units, a.u.) versus binding energy (kiloelectron volts, keV) and illustrate the results of SEM-energy dispersive spectroscopy (EDS) analysis on a surface of the cathode active material particle prepared in Example 2, inside the cathode active material particle prepared in Example 2, the results of SEM-EDS analysis on a surface of the cathode active material particle prepared in Comparative Example 3, and inside cathode active material particle prepared in Comparative Example 3, respectively.
Figure 5C:
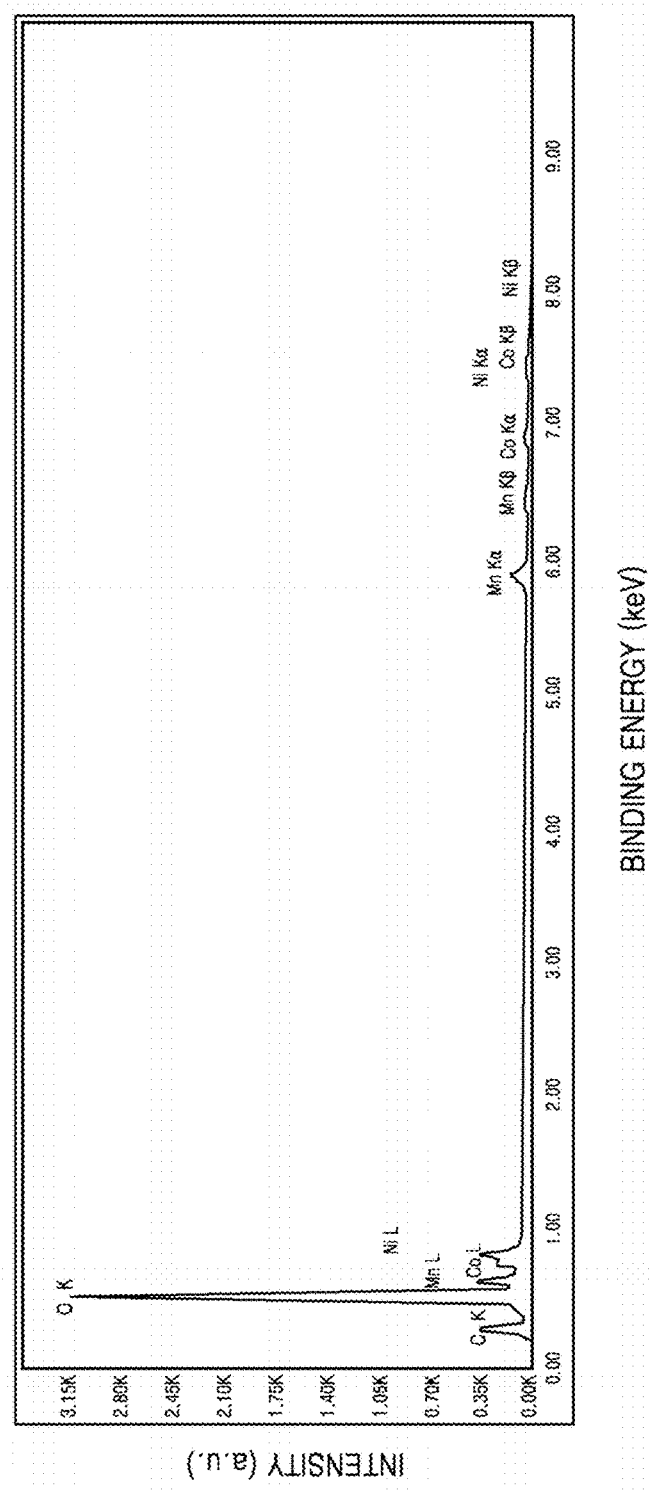
Figure 5D:
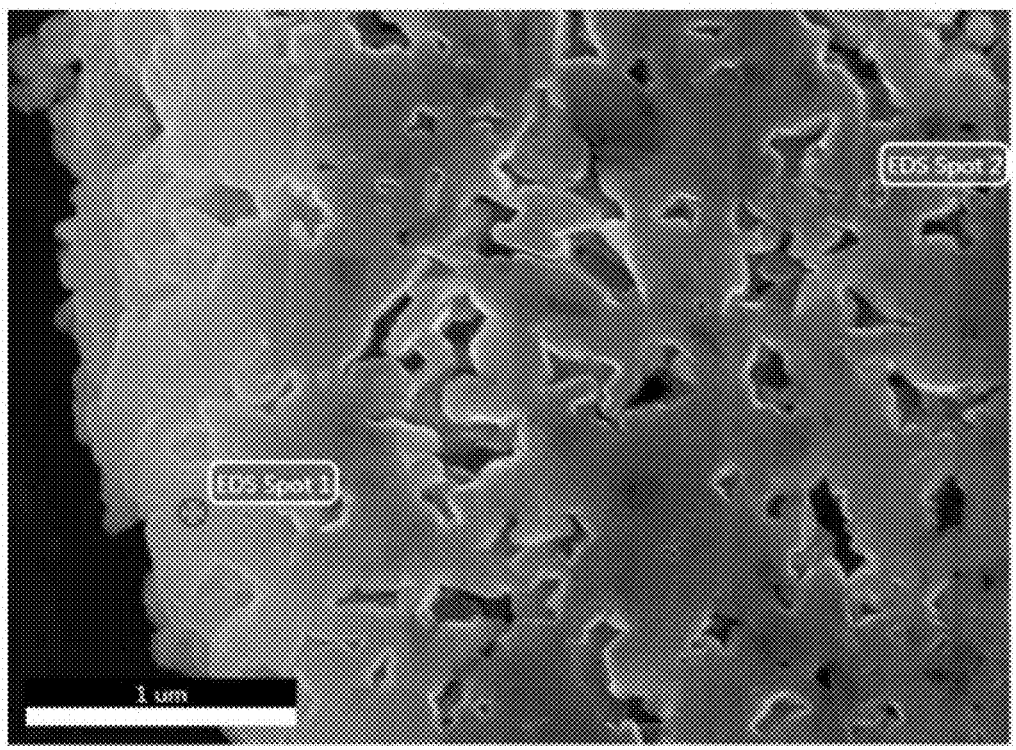

The results of SEM-EDS analysis on the cathode active material particle prepared in Example 2 are shown in FIG. 5A (SEM), FIG. 5B (particle surface), and FIG. 5C (inside the particle). The results of SEM-EDS analysis on the cathode active material particle prepared in Comparative Example 3 are shown in FIG. 5D (SEM), FIG. 5E (particle surface), and FIG. 5F (inside the particle). The results of ICP analysis are shown in Table 2.

TABLE 2

| Example | Compositions of cathode active materials | ICP-AES analysis (atom %) | | | | |
|---|---|---|---|---|---|---|
| | | Li | Ni | Co | Mn | V |
| Example 1 | $Li_{1.48}[(Ni_{0.225}Co_{0.15}Mn_{0.625})_{0.9970}V_{0.0030}]O_2$ | 1.48 | 0.223 | 0.148 | 0.626 | 0.0030 |
| Example 2 | $Li_{1.51}[(Ni_{0.225}Co_{0.15}Mn_{0.625})_{0.9969}V_{0.0031}]O_2$ | 1.51 | 0.222 | 0.148 | 0.627 | 0.0031 |
| Example 3 | $Li_{1.51}[(Ni_{0.225}Co_{0.15}Mn_{0.625})_{0.9975}V_{0.0025}]O_2$ | 1.51 | 0.222 | 0.148 | 0.627 | 0.0025 |
| Example 4 | $Li_{1.32}[(Ni_{0.25}Co_{0.10}Mn_{0.65})_{0.9981}V_{0.0019}]O_2$ | 1.32 | 0.245 | 0.097 | 0.656 | 0.0019 |
| Example 5 | $Li_{1.32}[(Ni_{0.25}Co_{0.10}Mn_{0.65})_{0.9964}V_{0.0036}]O_2$ | 1.32 | 0.248 | 0.099 | 0.650 | 0.0036 |
| Comparative Example 1 | $Li_{1.48}[Ni_{0.225}Co_{0.15}Mn_{0.625}]O_2$ | 1.48 | 0.221 | 0.148 | 0.630 | — |
| Comparative Example 2 | $Li_{1.51}[Ni_{0.225}Co_{0.15}Mn_{0.625}]O_2$ | 1.51 | 0.221 | 0.148 | 0.630 | — |
| Comparative Example 3 | $Li_{1.40}[(Ni_{0.25}Co_{0.1}Mn_{0.65})_{0.995}V_{0.005}]O_2$ | 1.40 | 0.224 | 0.110 | 0.646 | 0.005 |
| Comparative Example 4 | $Li_{1.51}[(Ni_{0.225}Co_{0.15}Mn_{0.625})_{0.995}V_{0.005}]O_2$ | 1.51 | 0.222 | 0.149 | 0.610 | 0.005 |
| Comparative Example 5 | $Li_{1.51}[(Ni_{0.225}Co_{0.15}Mn_{0.625})_{0.99}V_{0.01}]O_2$ | 1.51 | 0.221 | 0.148 | 0.630 | 0.01 |

Accordingly, it was found that the oxidation number of vanadium cations doped in a layered lithium transition metal oxide lattice in the cathode active materials prepared in Examples 1 and 2 was +4.

Analysis Example 2: Scanning Electron Microscopy (SEM) Analysis, SEM-Energy Dispersive Spectroscopy (EDS) Analysis, and Inductively Coupled Plasma-Atomic Emission Spectroscopy (ICP-AES) Analysis 1.1. Particle Shape Analysis SEM analysis was performed on the shape of the transition metal hydroxide particle doped with $V^{4+}$ ions obtained in Example 1 and the transition metal hydroxide particle not doped with $V^{4+}$ ions prepared in Comparative Example 1, and the shape of the cathode active material particle prepared in Example 1, and the shape of the cathode active material particle prepared in Comparative Example 1. The SEM analysis was performed using JSM-7600F (available from JEOL Co., Ltd). The results thereof are shown in FIGS. 4A and 4B, and FIGS. 4C and 4D, respectively.

Referring to FIGS. 4A and 4B, it was found that the shape of the transition metal hydroxide particle was the same regardless of whether the layered lithium transition metal oxide lattice is doped with $V^{4+}$ ions or not.

Referring to FIGS. 5A to 5C, peaks with regard to elements including transition metal elements on the surface of and inside the cathode active material particle prepared in Example 2 were found to have similar peak positions. Although the distribution of vanadium elements on the surface of and inside the cathode active material particle prepared in Example 2 was not distinctly verified, it was found that a small amount of vanadium elements was present thereon, according to Table 2. Accordingly, it was found that vanadium elements on the surface of and inside the cathode active material particle prepared in Example 2 were homogeneously distributed.

Figure 5E:
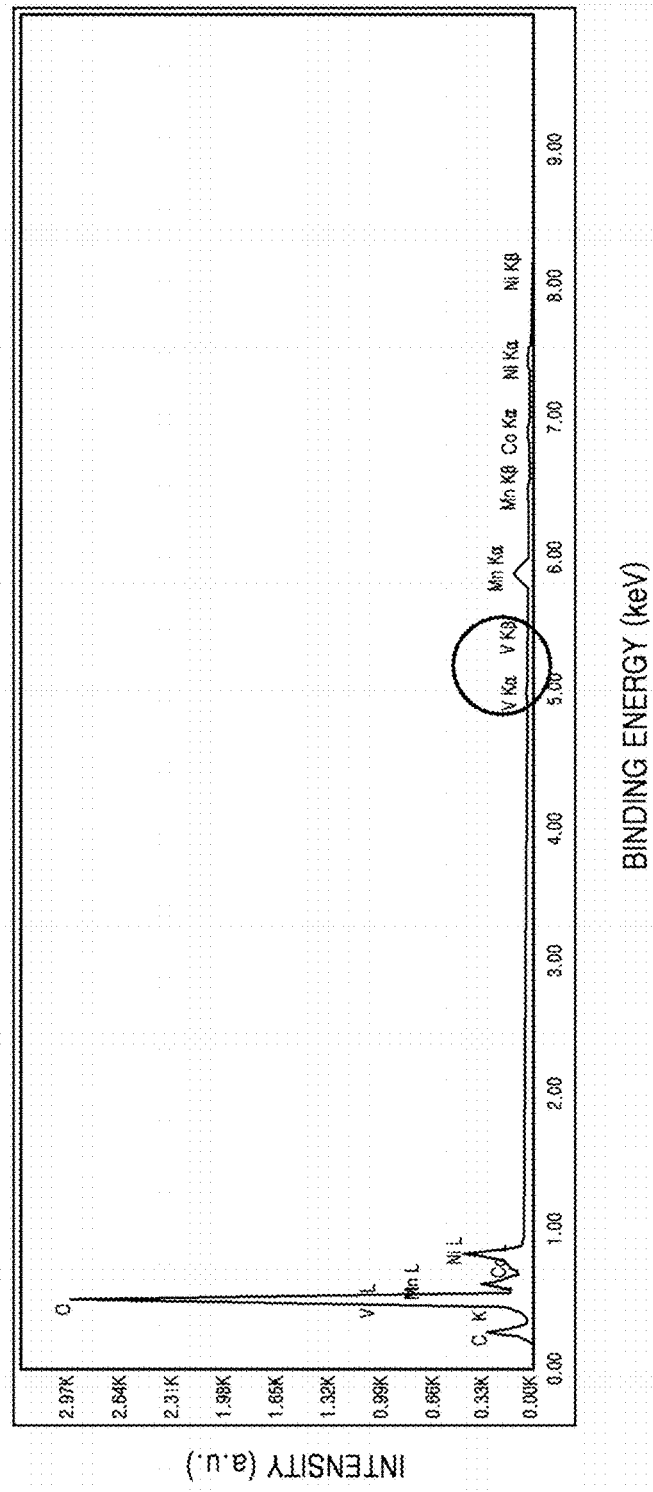
Figure 5F:
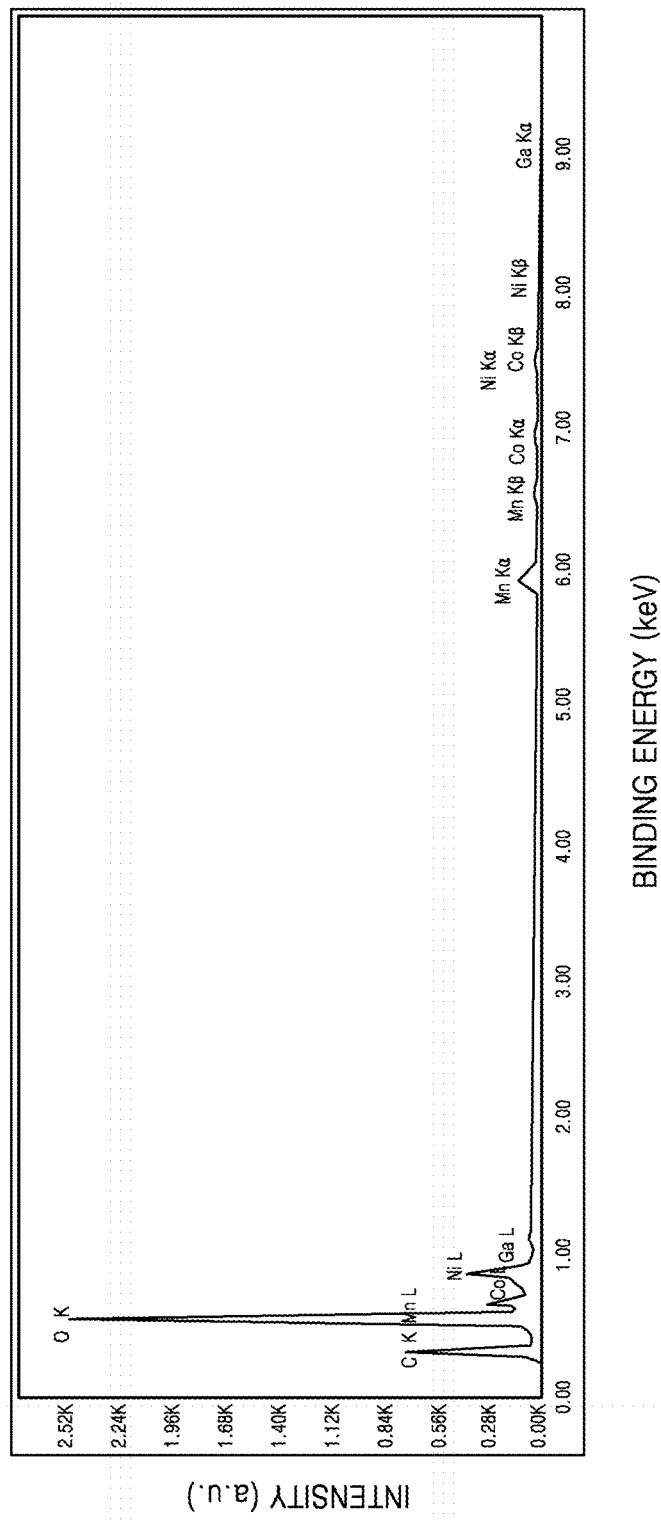

Referring to FIG. 5D to 5F, it was found that vanadium elements were present only on the surface of the cathode active material particle prepared in Comparative Example 3. According to Table 2, the presence of vanadium elements may be verified.

Analysis Example 3: X-Ray Diffraction (XRD) Analysis

XRD analysis was performed on the cathode active materials prepared in Example 3, Comparative Example 2, Comparative Example 4, and Comparative Example 5. The results thereof are shown in FIG. 6.

Figure 6:
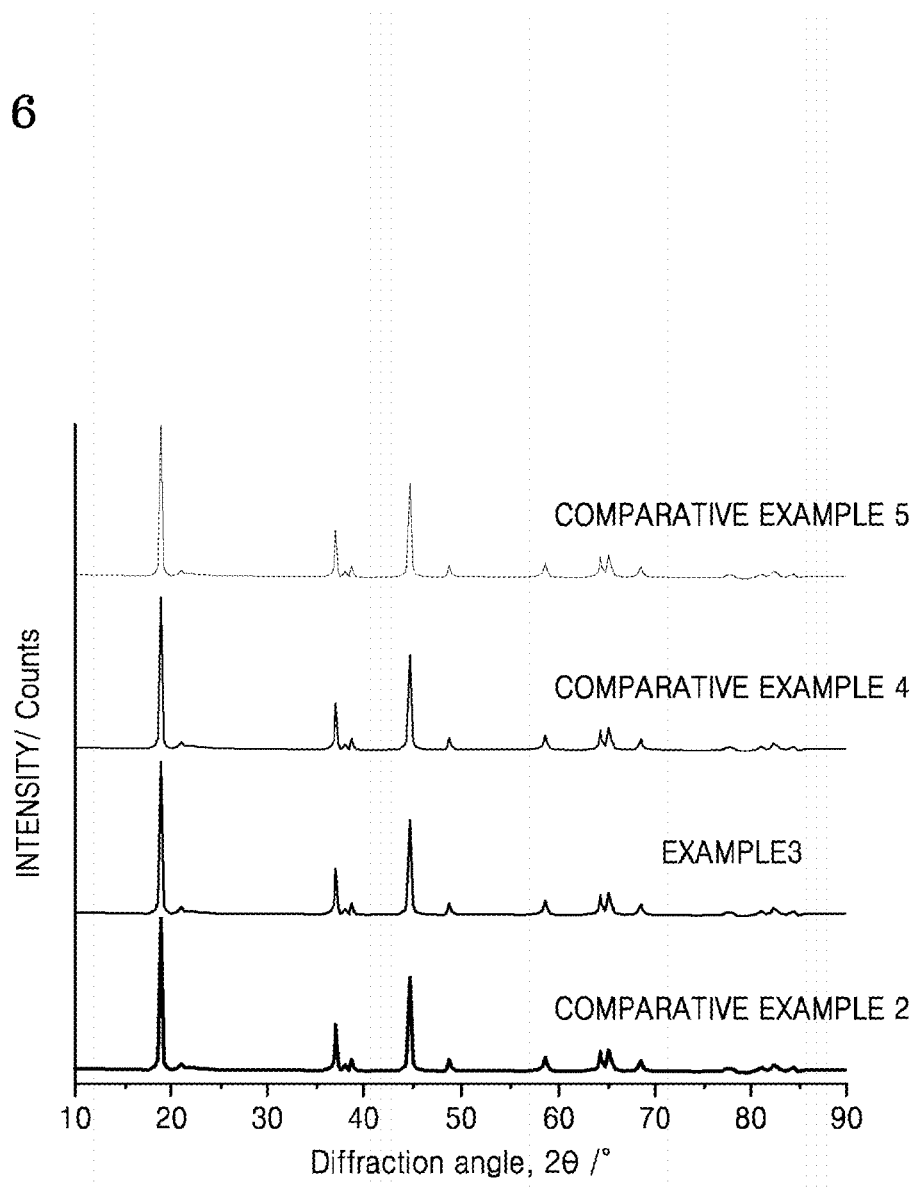
FIG. 6 is a graph of intensity (counts) versus diffraction angle (degrees two-theta, $2\theta$) and illustrates the results of X-ray diffraction (XRD) analysis performed on cathode active materials prepared in Example 3, Comparative Example 2, Comparative Example 4, and Comparative Example 5.

Referring to FIG. 6, the cathode active materials prepared in Comparative Example 4 and 5 showed a peak of $V_2O_5$ oxide at a diffraction angle (2θ) of about 20.0 degrees (° 2θ) to about 24.0° 2θ, and the cathode active materials prepared in Example 3 and Comparative Example 2 did not show a peak of $V_2O_5$ oxide at a diffraction angle (2θ) of about 20.0°2θ to about 24.0° 2θ.

Accordingly, it was found that in the cathode active material prepared in Example 3, any other impurities of vanadium ions having an oxidation number +5 was included in the layered lithium transition metal oxide lattice other than vanadium ions having an oxidation number of +4.

Evaluation Example 1: Charging and Discharging Test

The coin-type lithium half-cells prepared in Examples 6 and 7 and Comparative Examples 6 and 7 were charged at room temperature of about 25° C. at a current rate of 0.1 C in a constant current until the voltage reached 4.7 volts (V) (vs. Li). Then, the coin-type lithium half-cells were discharged at a current rate of 0.1 C in a constant current until the voltage reached a cut-off voltage of about 2.5 V (vs. Li) (formation process).

Subsequently, each of the coin-type lithium half-cells after the formation process were charged at room temperature of about 25° C. at a current rate of 0.1 C in a constant current until the voltage reached 4.6 V (vs. Li), followed by discharging at a current rate of 0.1 C in a constant current until the voltage reached 2.5 V (vs. Li).

Then, the coin-type lithium half-cells were charged at a current rate of 0.5 C in a constant current until the voltage reached 4.6 V (vs. Li), followed by discharging at a current rate of 0.2 C in a constant current until the voltage reached 2.5 V (vs. Li).

Next, the coin-type lithium half-cells were charged at a current rate of 1.0 C in a constant current until the voltage reached 4.6 V (vs. Li), followed by discharging at a current rate of 1.0 C in a constant current until the voltage reached 2.5 V (vs. Li). This cycle of charging and discharging was repeated 40 times.

The C rate for current means a current which will discharge a battery in one hour, e.g., a C rate for a battery having a discharge capacity of 1.6 ampere-hours would be 1.6 amperes.

Figure 7:
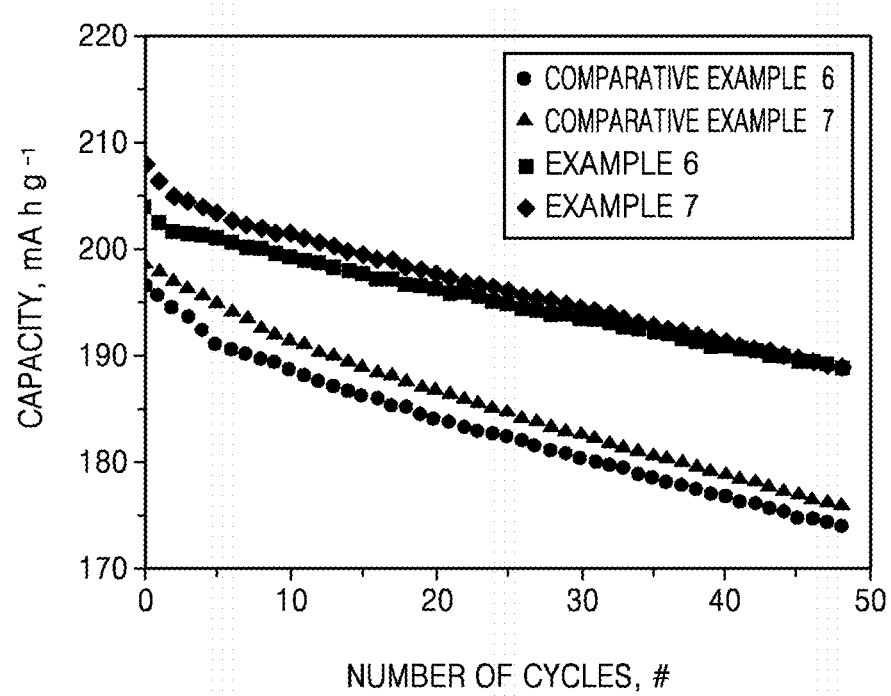
FIG. 7 is a graph of discharge capacity milliampere hours per gram, $mAh \cdot g^{-1}$) versus number of cycles for the coin-type lithium half-cells prepared in Examples 6 and 7 and Comparative Examples 6 and 7.
Figure 8:
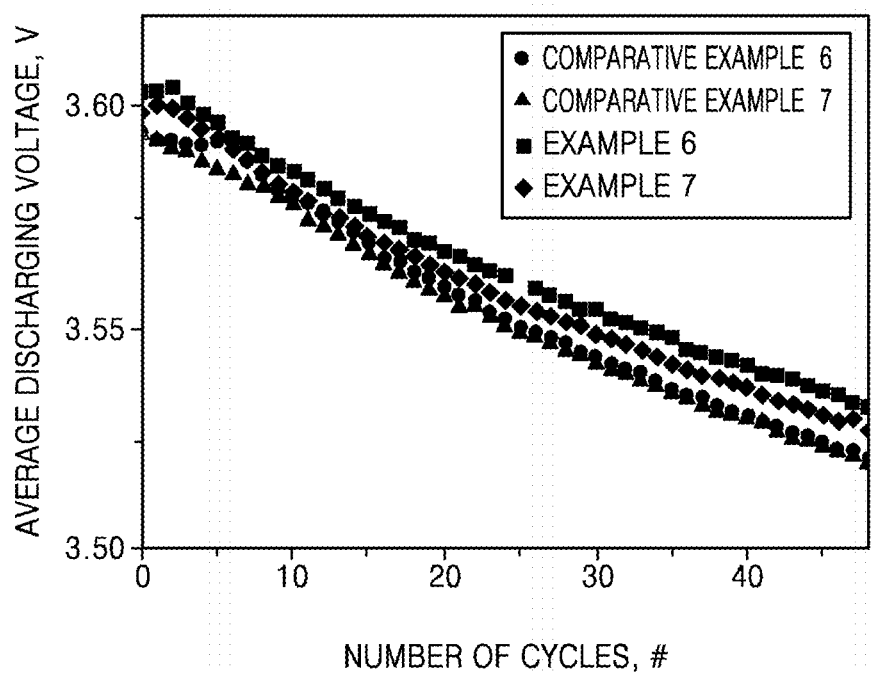
FIG. 8 is a graph of average discharge voltage (volts, V) versus number of cycles for the coin-type lithium half-cells prepared in Examples 6 and 7 and Comparative Examples 6 and 7.

The results of discharging capacity and average discharging voltage according to the number of cycles are shown in FIGS. 7 and 8. The initial discharging capacity, capacity retention, and voltage retention characteristics are shown in Table 3. The results of the initial discharging capacity and the capacity retention are calculated using Equation 1 and Equation 2.

Initial discharging capacity [milliampere-hours per gram (mAh/g)]=discharging capacity at the 4$^{th}$ cycle     Equation 1

Capacity retention [%]=[Discharging capacity at the 40$^{th}$ cycle/discharging capacity at the 4$^{th}$ cycle]×100%     Equation 2

TABLE 3

| Example | Initial discharge capacity [mAh/g] | Capacity retention [%] | ΔV after 40$^{th}$ cycle [mV] |
|---|---|---|---|
| Example 6 | 206 | 92.9 | −68.7 |
| Example 7 | 209 | 91.7 | −70.8 |
| Comparative Example 6 | 197 | 89.7 | −73.2 |
| Comparative Example 7 | 200 | 89.7 | −72.8 |

Referring to FIGS. 7 and 8 and Table 3, the initial discharging capacity of the coin-type lithium half-cell prepared in Examples 6 and 7 were found to be improved in a range of about 6 mAh/g to about 9 mAh/g compared to the coin-type lithium half-cells prepared in Comparative Examples 6 and 7, and the capacity retention of the coin-type lithium half-cells prepared in Examples 6 and 7 were improved in a range of about 2.0% to about 3.2%. The voltage decrease of the coin-type lithium half-cells prepared in Examples 6 and 7 after the 40$^{th}$ cycle was suppressed compared to the coin-type lithium half-cells prepared in Comparative Examples 6 and 7. Thus, the voltage retention characteristics of the coin-type lithium half-cells prepared in Examples 6 and 7 after the 40$^{th}$ cycle improved.

In addition, the coin-type lithium half-cells prepared in Example 8 and Comparative Examples 6, 9, and 10 underwent the formation process as described above at room temperature of about 25° C., followed by charging at a current rate of 0.1 C in a constant current until the voltage reached 4.6 V (vs. Li) and discharging at a current rate of 0.1 C in a constant current until the voltage reached 2.5 V (vs. Li).

Then, the coin-type lithium half-cells were charged at a current rate of 0.5 C in a constant current until the voltage reached 4.6 V (vs. Li), followed by discharging at a current rate of 0.2 C in a constant current until the voltage reached 2.5 V (vs. Li).

Next, the coin-type lithium half-cells were charged at a current rate of 1.0 C in a constant current until the voltage reached 4.6 V (vs. Li), followed by discharging at a current rate of 1.0 C in a constant current until the voltage reached 2.5 V (vs. Li). This cycle of charging and discharging was repeated 58 times. The initial discharging capacity, capacity retention, and voltage decrease characteristics are shown in Table 4. The results of the initial discharging capacity and the capacity retention are calculated using Equation 3 and Equation 4.

Initial discharging capacity [mAh/g]=discharging capacity at the 9$^{th}$ cycle     Equation 3

Capacity retention [%]=[Discharging capacity at the 58$^{th}$ cycle/discharging capacity at the 9$^{th}$ cycle]×100%     Equation 4

TABLE 4

| Example | Initial discharge capacity [mAh/g] | Capacity retention [%] | ΔV after 58$^{th}$ cycle [mV] |
|---|---|---|---|
| Example 8 | 199 | 93.7 | −65 |
| Comparative Example 6 | 204 | 89.7 | −70 |
| Comparative Example 9 | 194 | 88.7 | −75 |
| Comparative Example 10 | 166 | 92.2 | −65 |

Referring to Table 4, it was found that the initial discharging capacity of the coin-type lithium half-cell prepared in Example 8 improved compared to the coin-type lithium half-cells prepared in Comparative Examples 9 and 10, and the capacity retention of the coin-type lithium half-cell prepared in Example 8 improved compared to the coin-type lithium half-cells prepared in Comparative Examples 6, 9, and 10. The voltage decrease of the coin-type lithium half-cell prepared in Examples 8 after the 58$^{th}$ cycle was suppressed compared to the coin-type lithium half-cells prepared in Comparative Examples 6 and 9. Thus, the voltage retention characteristics of the coin-type lithium half-cell prepared in Examples 8 improved.

As described above, according to an exemplary embodiment, the cathode active material may include a layered lithium transition metal oxide, in which a metal cation having an oxidation number of +4 is doped in an octahedral site of a transition metal oxide lattice. A cathode and a lithium secondary battery including the cathode active material may have improved initial discharge capacity, lifespan characteristics, and voltage maintaining characteristics. In addition, the method of preparing the cathode active material may be capable of mass-production.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A cathode active material comprising:
a layered lithium transition metal oxide comprising overlithiated lithium transition metal oxide represented by Formula 1:

$$Li_{1+x}[M_{1-y}M'_y]O_{2\pm\alpha} \quad \text{Formula 1}$$

Wherein, in Formula 1,
$1.1<(1+x)\leq1.6$, $0<y\leq0.0045$, and $0\leq\alpha<1$,
M is at least one transition metal selected from Ni, Co, Mn, and
M' is at least one metal selected from V, Hf, Pa, U, NP, PU, Ce, Pb, and Ge, wherein the layered lithium transition metal oxide comprises a metal cation having an oxidation number of +4,
wherein the metal cation is selected from $V^{4+}$, $Hf^{4+}$, $Pa^{4+}$, $U^{4+}$, $Np^{4+}$, $Pu^{4+}$, $Ce^{4+}$, $Pb^{4+}$, and $Ge^{4+}$,
wherein the metal cation is disposed in an octahedral site defined by oxygen atoms of a lattice of the layered lithium transition metal oxide, and
wherein the metal cation having an oxidation number of +4 is included in an amount ranging greater than 0 mole percent to about 0.0045 mole percent, based on 1 mole of a transition metal of the transition metal oxide.

2. The cathode active material of claim 1, wherein the metal cation having an oxidation number of +4 is $V^{4+}$.

3. The cathode active material of claim 1, wherein, in Formula 1, $1.32\leq(1+x)\leq1.52$.

4. The cathode active material of claim 1, wherein, in Formula 1, M' is V.

5. The cathode active material of claim 1, wherein the layered lithium transition metal oxide is a spherical particle, and an average particle diameter (D50) of the spherical particle is in a range of about 1 micrometer to about 20 micrometers.

6. The cathode active material of claim 5, wherein a surface of and an inside of the spherical particle comprises the metal cation having an oxidation number of +4.

7. The cathode active material of claim 6, wherein a shape of the spherical particle comprising the metal cation having an oxidation number of +4 in the surface of and in the inside of the spherical particle is identical to a shape of a spherical particle not comprising the metal cation having an oxidation number of +4 in a surface of and in an inside thereof.

8. A cathode comprising a cathode active material according to claim 1.

9. A lithium secondary battery comprising the cathode according to claim 8.

10. A method of preparing a cathode active material, the method comprising:
combining a metal cation precursor with a transition metal hydroxide precursor to provide a combination;
precipitating a transition metal hydroxide comprising a metal cation having an oxidation number of +4 from the combination, wherein the metal cation is selected from $V^{4+}$, $Hf^{4+}$, $Pa^{4+}$, $U^{4+}$, $Np^{4+}$, $Pu^{4+}$, $Ce^{4+}$, $Pb^{4+}$, and $Ge^{4+}$; and wherein the metal cation having an oxidation number of +4 is included in an amount ranging greater than 0 mole percent to about 0.0045 mole percent, based on 1 mole of a transition metal of the transition metal oxide; and
combining the transition metal hydroxide comprising the metal cation having an oxidation number of +4 with a lithium precursor to obtain a mixture; and
thermally treating the mixture to prepare the cathode active material according to claim 1.

11. The method of claim 10, wherein the metal cation precursor comprises at least one selected from $VOSO_4 \cdot xH_2O$ wherein $3\leq x\leq5$, and $V(CO_3)_2$.

12. The method of claim 10, wherein the transition metal hydroxide comprises a transition metal hydroxide represented by Formula 2:

$$[(M1)_{1-a}(M'1)_a](OH)_2 \quad \text{Formula 2}$$

wherein, in Formula 2,
$0\leq a\leq0.0045$,
M1 is at least one transition metal selected from Ni, Co, and Mn, and
M'1 is at least one metal selected from V, Hf, Pa, U, Np, Pu, Ce, Pb, and Ge.

13. The method of claim 10, wherein the combining of the transition metal hydroxide and the metal cation precursor comprises stirring a mixture of the metal cation precursor and the transition metal hydroxide precursor at a temperature of about 40° C. to about 60° C. and at a rate of about 600 revolutions per minute to about 1000 revolutions per minute.

14. The method of claim 10, further comprising adding a base during the combining in an amount effective to maintain a pH of the combination in a range of about 11 to about 12.

15. The method of claim 10, wherein the thermal treating is performed at a temperature of about 500° C. to about 900° C.

16. The method of claim 10, wherein the thermal treating is performed in an air atmosphere.

17. A cathode active material comprising:
a layered lithium transition metal oxide, wherein the layered lithium transition metal oxide comprises
a metal cation having an oxidation number of +4, and wherein the metal cation is disposed in an octahedral site of a lattice of the layered lithium transition metal oxide, wherein the layered lithium transition metal oxide comprises an overlithiated lithium transition metal oxide represented by Formula 1:

$$Li_{1+x}[M_{1-y}M'_y]O_{2+\alpha} \quad \text{Formula 1}$$

wherein, in Formula 1,
$1.1<(1+x)\leq1.6$, $0<y\leq0.0045$, and $0\leq\alpha<1$,
M is at least one transition metal selected from Ni, Co, and Mn, and
M' is at least one metal selected from V, Zr, Hf, Ti, Pa, U, Np, Pu, Ce, Pb, and Ge.

18. A lithium secondary battery comprising the cathode according to claim 17.

19. A method of preparing a cathode active material, the method comprising:
- combining a metal cation precursor with a transition metal hydroxide precursor to provide a combination;
- precipitating a transition metal hydroxide comprising a metal cation having an oxidation number of +4 from the combination;
- combining the transition metal hydroxide comprising the metal cation having an oxidation number of +4 with a lithium precursor to obtain a mixture; and
- thermally treating the mixture to prepare the cathode active material, wherein the cathode active material comprises:
- a layered lithium transition metal oxide, wherein the layered lithium transition metal oxide comprises
- a metal cation having an oxidation number of +4, and wherein the metal cation is disposed in an octahedral site of a lattice of the layered lithium transition metal oxide, and wherein the layered lithium transition metal oxide comprises an overlithiated lithium transition metal oxide represented by Formula 1:

$$Li_{1+x}[M_{1-y}M'_y]O_{2+\alpha} \qquad \text{Formula 1}$$

wherein, in Formula 1,
$1.1 < (1+x) \leq 1.6$, $0 < y \leq 0.0045$, and $0 \leq \alpha < 1$,
M is at least one transition metal selected from Ni, Co, and Mn, and
M' is at least one metal selected from V, Zr, Hf, Ti, Pa, U, Np, Pu, Ce, Pb, and Ge.

* * * * *

UNITED STATES PATENT AND TRADEMARK OFFICE
CERTIFICATE OF CORRECTION

PATENT NO. : 10,305,101 B2
APPLICATION NO. : 15/200052
DATED : May 28, 2019
INVENTOR(S) : Youhwan Son et al.

Page 1 of 1

It is certified that error appears in the above-identified patent and that said Letters Patent is hereby corrected as shown below:

In the Specification

In Column 5, Line 60, please delete "$Li_{1+}[M_{1-y}M'_y]O_{2+\alpha}$" and replace with -- $Li_{1+x}[M_{1-y}M'_y]O_{2+\alpha}$ --; and In the Claims In Column 21, Line 25, (approx.), in Claim 1, please delete "$Li_{1+x}[M_{1-y}M'_y]O_{2\pm\alpha}$" and replace with -- $Li_{1+x}[M_{1-y}M'_y]O_{2+\alpha}$ --.

Signed and Sealed this
Sixteenth Day of June, 2020

Andrei Iancu
*Director of the United States Patent and Trademark Office*